US008945909B2

(12) United States Patent
Takayama et al.

(10) Patent No.: US 8,945,909 B2
(45) Date of Patent: Feb. 3, 2015

(54) TUNABLE ELASTOMERIC NANOCHANNELS FOR NANOFLUIDIC MANIPULATION

(75) Inventors: Shuichi Takayama, Ann Arbor, MI (US); Michael David Thouless, Ann Arbor, MI (US); Dongeun Huh, Boston, MA (US); Kristen L. Mills, Cupertino, CA (US); Nicholas Joseph Douville, Saline, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 828 days.

(21) Appl. No.: 12/597,634

(22) PCT Filed: Apr. 23, 2008

(86) PCT No.: PCT/US2008/061276
§ 371 (c)(1),
(2), (4) Date: Feb. 5, 2010

(87) PCT Pub. No.: WO2008/134363
PCT Pub. Date: Nov. 6, 2008

(65) Prior Publication Data
US 2010/0159462 A1 Jun. 24, 2010

Related U.S. Application Data

(60) Provisional application No. 60/913,955, filed on Apr. 25, 2007.

(51) Int. Cl.
*C12M 1/00* (2006.01)
*C12Q 1/68* (2006.01)
(Continued)

(52) U.S. Cl.
CPC ........... *B82Y 30/00* (2013.01); *B01L 3/502707*
(2013.01); *B01L 3/502761* (2013.01); *B01L 2200/0663* (2013.01); *B01L 2200/0668* (2013.01); *B01L 2300/0864* (2013.01); *B01L 2300/0896* (2013.01); *B01L 2300/123* (2013.01); *B01L 2400/0418* (2013.01); *B01L 2400/0487* (2013.01); *B01L 2400/082* (2013.01)
USPC ... 435/283.1; 435/6.1; 435/287.1; 435/287.2; 435/288.5; 435/289.1; 435/395; 422/68.1; 528/502; 264/288.4; 264/291

(58) Field of Classification Search
USPC .............. 435/6.1, 283.1, 287.1, 287.2, 288.5, 435/289.1, 395; 422/68.1; 264/288.4, 291; 528/502
See application file for complete search history.

(56) References Cited

U.S. PATENT DOCUMENTS 5,328,559 A * 7/1994 Jerman ........................... 216/84
5,843,767 A 12/1998 Beattie
(Continued)

FOREIGN PATENT DOCUMENTS

WO  WO 2004/081741  *  9/2004

OTHER PUBLICATIONS

Lee et al, Compatibility of Mammalian Cells on Surfaces of Poly(dimethylsiloxane), 2004, Langmuir, 20, 11684-11691.*
(Continued)

*Primary Examiner* — Narayan Bhat
(74) *Attorney, Agent, or Firm* — Casimir Jones SC

(57) ABSTRACT

The invention relates to tunable elastomeric nanochannels for nanofluidic manipulation. In particular, the present invention relates to nanochannels for performing biological assays.

21 Claims, 48 Drawing Sheets

(51) Int. Cl.

| | |
|---|---|
| *C12M 1/34* | (2006.01) |
| *C12M 3/00* | (2006.01) |
| *C12N 5/00* | (2006.01) |
| *G01N 15/06* | (2006.01) |
| *C08F 6/00* | (2006.01) |
| *B28B 11/08* | (2006.01) |
| *B82Y 30/00* | (2011.01) |
| *B01L 3/00* | (2006.01) |

(56) References Cited

U.S. PATENT DOCUMENTS

| | | | |
|---|---|---|---|
| 7,129,554 B2 | 10/2006 | Lieber et al. | |
| 2002/0058332 A1* | 5/2002 | Quake et al. | 435/288.3 |
| 2002/0114738 A1* | 8/2002 | Wyzgol et al. | 422/100 |
| 2003/0087198 A1 | 5/2003 | Dharmatilleke et al. | |
| 2004/0063199 A1* | 4/2004 | Takayama et al. | 435/287.2 |

OTHER PUBLICATIONS

Matsuoka et al, Nanoscale Squeezing in Elastomeric Nanochannels for Single Chromatin Linearization, 2012, Nano Lett., 12, 6480-6484.*
Bar et al., "Investigation of the stiffness change in, the indentation force and the hydrophobic recovery of plasma-oxidized polydimethylsiloxane surfaces by tapping mode atomic force microscopy" Polymer 2001 42(8):3627-3632.
Bowden et al., "The controlled formation of ordered, sinusoidal structures by plasma oxidation of an elastomeric polymer" Appl. Phys. Lett. 1999 75:2557-2559.
Chaudhury, "Direct measurement of interfacial interactions between semispherical lenses and flat sheets of poly (dimethylsiloxane) and their chemical derivatives" Langmuir 1991 7(5):1013-1025.
Chen, LX et al., "Electrokinetic pumping system based on nanochannel membrane for liquid delivery" Chinese Chemical Letters (2007). 18(3):352-354.
Clement et al., "Atomic force microscopy investigation of filled elastomers and comparison with transmission electron microscopy—application to silica-filled silicone elastomers" Polymer 2001 42(14):6259-6270.
Duffy et al., "Rapid Prototyping of Microfluidic Systems in Poly(dimethylsiloxane)" Anal. Chem. 1998 70(23): 4974-4984.
Efimenko et al., "Nested self-similar wrinkling patterns in skins." Nature Materials 2005 4(4):293-297.
Fritz and Owen, "Hydrophobic Recovery of Plasma-Treated Polydimethylsiloxane" Journal of Adhesion 1995 54(1): 33-45.
Hillborg and Gedde, "Hydrophobicity changes in silicone rubbers" IEEE Transactions on Dielectrics and Electrical Insulation 1999 6(5): 703-717.
Hillborg et al., "Crosslinked polydimethylsiloxane exposed to oxygen plasma studied by neutron reflectometry and other surface specific techniques" Polymer 2000 1(18):6851-6863.
Ho and Suo, J. Appl. Mech.-Trans., ASME 1993 60:890.
Huh et al., "Tuneable elastomeric nanochannels for nanofluidic manipulation" Nat. Mater. 2007 6:424-428.
Hui et al., "Constraints on Microcontact Printing Imposed by Stamp Deformation" Langmuir 2002 18(4):1394-1407.
Katzenberg, "Plasma-bonding of poly(dimethylsiloxane) to glass" E-Polymers 2005 (60).
Magonov et al., "Phase imaging and stiffness in tapping-mode atomic force microscopy" Surface Science 1997 375:L385-L391.
Muller-Buschbaum et al., "A new route to large-area ordered polymeric nano-channel arrays" Appl. Phys. Lett. 88 2006.
Mullins, "Theory of Thermal Grooving" Journal of Applied Physics 1957 28(3):333-339.
Oliver and Pharr, "An improved technique for determining hardness and elastic modulus using load and displacement sensing indentation experiments" Journal of Materials Research 1992 7(6):1564-1583.
Shenoy et al., "Crack patterns in brittle thin films" International Journal of Fracture 2000 103(1):1-17.
Sivanesan et al., "Polymer Nanochannels Fabricated by Thermomechanical Deformation for Single Molecule Analysis," Anal. Chem. 2005 77:2252-2258.
Thouless, "Crack Spacing in Brittle Films on Elastic Substrates," J. Am. Ceram. Soc., 73, 2144-2146 (1990).
Thouless et al., "Cracking of brittle films on elastic substrates" Acta Metallurgica et Materialia 1992 40(6):1287-1292.
Zhu et al., "Fabrication of reconfigurable protein matrices by cracking" Nature Materials 2005 4(5):403-406.
Bhattacharya et al., "Studies on Surface Wettability of Poly(Dimethyl) Siloxane (PDMS) and Glass Under Oxygen-Plasma Treatment and Correlation With Bond Strength" Journal of Microelectromechanical Systems 2005 14(3):590-597.
Fu et al., "A patterned anisotropic nanofluidic sieving structure for continuous-flow separation of DNA and proteins" Nature Nanotechnology 2007 2:121-128.
Kuo, T. et al. Sensors and Actuators A 2003 102:223-233.
Thouless et al., "Effect of surface diffusion on the creep of thin films and sintered arrays of particles" Acta Metallurgica et Materialia 1993 41(4):1057-1064.

* cited by examiner

TUNABLE ELASTOMERIC NANOCHANNELS FOR NANOFLUIDIC MANIPULATION

This invention was made with government support under EB003793 and HG004653 awarded by the National Institutes of Health and CMI0403603 awarded by the National Science Foundation. The Government has certain rights in the invention.

FIELD OF THE INVENTION

The invention relates to tunable elastomeric nanochannels for nanofluidic manipulation. In particular, the present invention relates to nanochannels for performing biological assays.

BACKGROUND OF THE INVENTION

The success and proliferation of microfluidics research has spawned significant interest in nanofluidics research as techniques for nanofabrication are advanced and becoming more widespread. Nanofluidics research encompasses a very broad range of topics from chemistry to biology to physics; the promise of answers to fundamental questions in each is the goal. Some of the research being pursued includes the fundamental properties of liquids and the separation or sorting of molecules based on size and charge. Furthermore, there is considerable interest in the controlled confinement and manipulation of single polymeric or bio-molecules (e.g., DNA) for analysis. The current methods for fabricating nanochannels for molecular confinement generally consist of multiple rather complicated steps involving costly equipment. Additionally, most of these methods produce static nanochannels, where the cross-sectional dimensions cannot be changed during an experiment.

Currently, nanochannels are generally produced with standard microfabrication techniques. In substrates of silicon, $SiO_2$, or silicon nitride, lithographic techniques such as electron-beam lithography or nano-imprint lithography and reactive ion etching (Fu et al., *Nature Nanotechnology* 2, 121 (2007)) are used to create raised patterns of networks of channels. Non-lithographic approaches include focused ion beam milling or the patterning of sacrificial layers. After a pattern has been created, frequently a bonding step is required. The use of high temperature and pressure techniques, like anodic bonding, is not uncommon. Elastomeric materials permit the employment of the easier and cheaper soft lithography techniques for creating nanochannels (Huh et al., *Nat. Mater.* 6, 424 (2007)). Other methods include a method for creating open channels by which a diluted PDMS mixture is directionally swiped onto a glass slide using lint-free towelettes for very small (3 nm×160 nm) nanochannels (Muller-Buschbaum et al., *Appl. Phys. Lett.* 88, (2006)). In borrowing from the communications industry, a method analogous to that of drawing optical fibers was used to thermally draw-down a polycarbonate millimeter-sized rectangular cross-section containing initial 30-μm sized microchannels ending up with approximately 700 nm-diameter nanochannels (Sivanesan et al., *Anal. Chem.* 77, 2252 (2005)).

What is needed in the art are simple and robust compositions and methods for performing nanoscale biological assays.

SUMMARY

The invention relates to tunable elastomeric nanochannels for nanofluidic manipulation. In particular, the present invention relates to nanochannels for performing biological assays.

For example, in some embodiments, the present invention provides a microfluidic device, kit or system, comprising: a substrate comprising at least one inlet and at least one outlet (e.g., microchannels) formed in the substrate, wherein the inlets and outlets are in fluid communication with one or more elastomeric nanochannels formed in the substrate. In some embodiments, the system further comprises a component configured to exert strain on the nanochannels such the cross sections of the nanochannels are altered (e.g., compressed or stretched). In some embodiments, the substrate is comprised of one or more pieces of a stiff thin film (e.g., a metal such as gold or oxidized PDMS) sandwiched by one or more compliant materials (e.g., unoxidized bulk PDMS). In some embodiments, the nanochannels intersect each other. In some embodiments, the nanochannels originate from different inlets or outlets.

In some embodiments, the system further comprises a transport component configured to transport molecules through the nanochannels (e.g., using an electric field). In some embodiments, the system further comprises a biological material (e.g., genomic DNA or other nucleic acid, protein, cell, etc.) contained in the nanochannel.

The present invention further provides a method, comprising: contacting a biological material (e.g., genomic DNA or other nucleic acid, protein, cell, etc.) with a substrate comprising one or more inlets and outlets (e.g., microchannels) formed in the substrate, wherein the inlets and outlets are in fluid communication with a plurality of elastomeric nanochannels formed in the substrate under conditions such that the biological molecule enters the nanochannels. In some embodiments, molecules are moved into or through the nanochannels using a transport component (e.g., a component that generates an electric field). In some embodiments, the method includes the step of exerting strain on the nanochannels under conditions such that cross sections of the nanochannels are altered (e.g., compressed or stretched). In some embodiment, the nanochannels allow smaller molecules to move through the channels and prevent or restrict the movement or entry of larger molecules (e.g., to separate molecules based on size or charge).

The present invention additionally provides a cell growth system, comprising: a substrate comprising at least one inlet and at least one outlet (e.g., microchannels) formed in the substrate, wherein the inlet and outlet are in fluid communication with one or more elastomeric nanochannels formed in the substrate; a component configured to exert strain on the nanochannels such that the cross section of the nanochannels is altered; and a plurality of cells contained within the nanochannels.

Embodiments of the present invention further provide a method for fabrication of a nanochannel, comprising: stretching a substrate comprising at least one stiff thin film (e.g., a metal such as gold or oxidized PDMS) sandwiched by one or more compliant materials (e.g., unoxidized bulk PDMS) is generated.

While exemplary embodiments in accordance with the invention are illustrated and disclosed, such disclosure should not be construed to limit the invention. It is anticipated that various modifications and alternative designs may be made without departing from the scope of the invention.

DEFINITIONS

Figure 1:
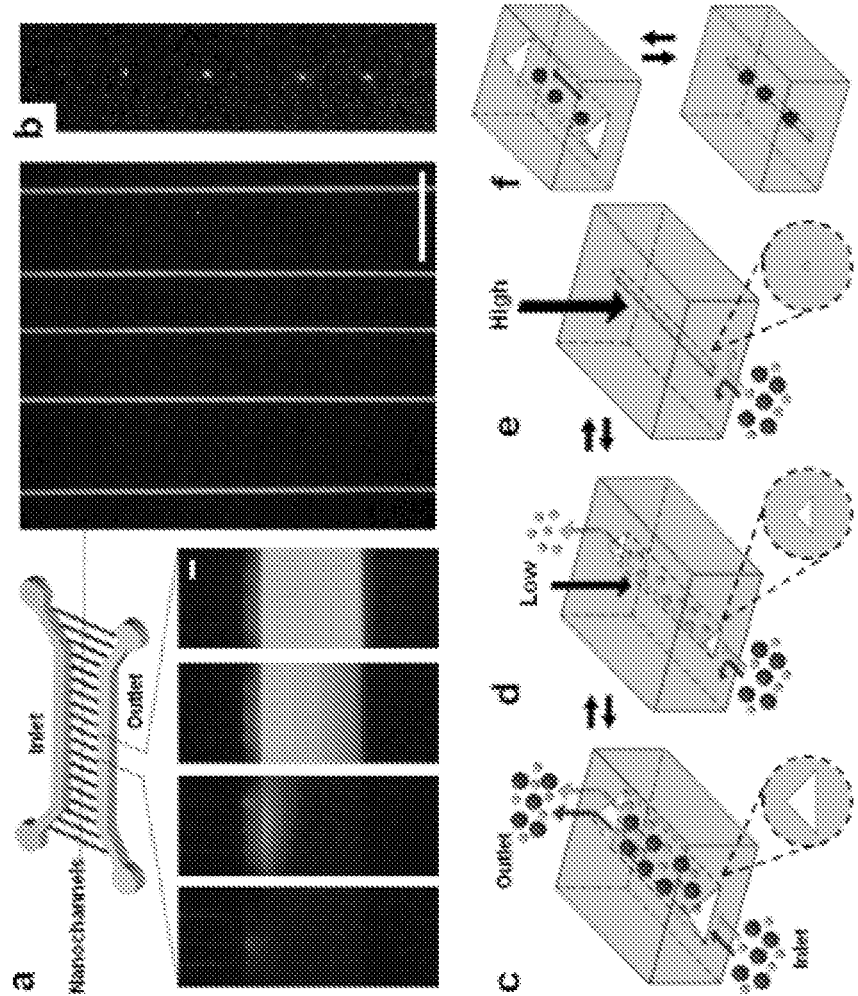
FIG. 1 shows size-adjustable elastomeric nanochannels. a, The system has an array of nanochannels spanning microscale inlet and outlet compartments separated by 500 μm. b, A single-file flow of single 20-nm quantum dots along a nanochannel. c, The larger cross-section of relaxed nanochannels allows both larger and smaller particles to pass through simultaneously. d, Elastomeric nanochannels are compressed to change their cross-sectional size. e, Nanochannels loaded with larger stresses (42 kPa) become extremely small, excluding sample particles regardless of their size. f, Channel deformation traps single nanoparticles.
Figure 2:
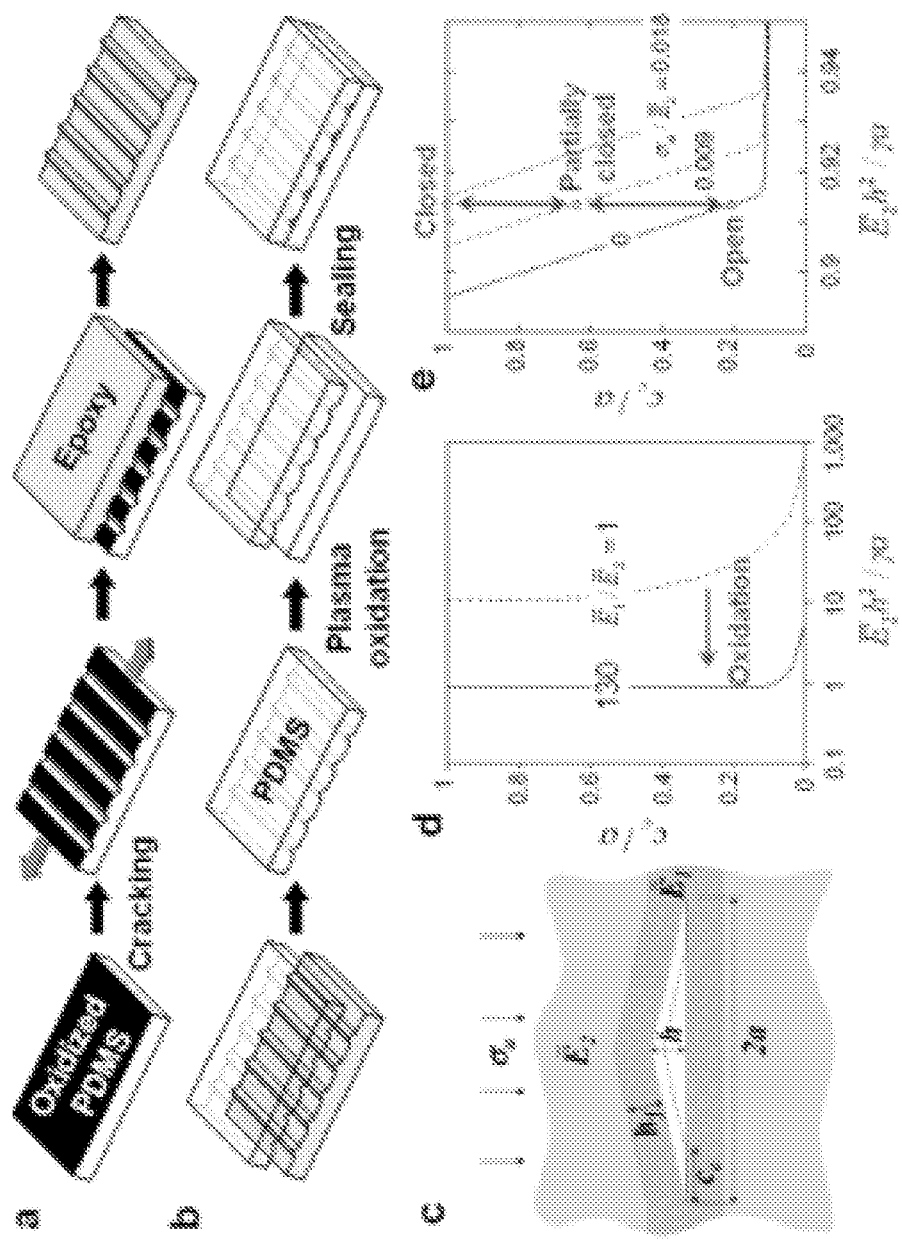
FIG. 2 shows fabrication of structurally stable elastomeric nanochannels. a, A PDMS slab exposed to oxygen plasma is stretched to generate linear nanoscale cracks. The nanocracks are replicated onto UV-curable epoxy. b, PDMS prepolymer is cast against the epoxy mold to generate negative relief patterns of nanochannels. The PDMS substrate is then briefly oxidized and sealed against an oxidized PDMS slab to form an array of enclosed nanochannels. c, The cross-section of relaxed nanochannels can be approximated as an isosceles triangle with an average base length of 688 nm (2a) and an average height of 78 nm (h). d, Normalized closure distance ($c_c/a$) is plotted against $\bar{E}_2 h^2 / \gamma a$ for both the non-oxidized ($\bar{E}_1/\bar{E}_2=1$) and oxidized ($\bar{E}_1/\bar{E}_2=130$) states when there is no applied compressive stress ($\sigma_a/\bar{E}_2=0$). e, The solid and dashed lines indicate the closure distance for relaxed and compressed nanochannels, respectively.
Figure 3:
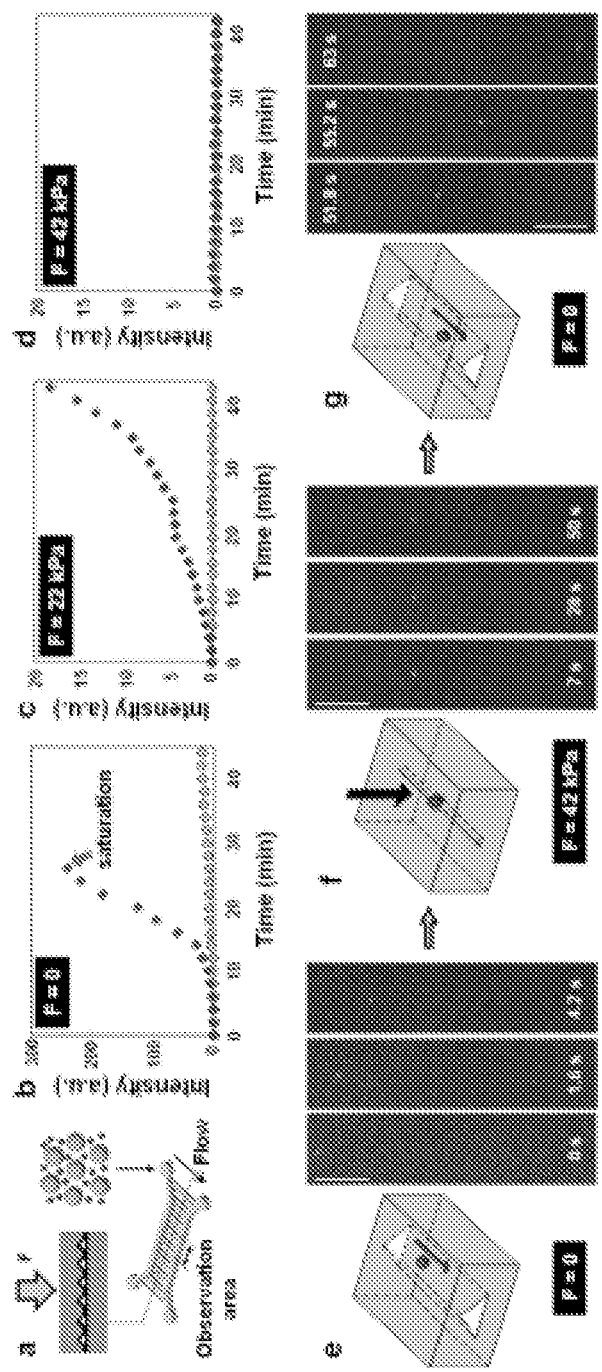
FIG. 3 shows nanofluidic sample trafficking using tunable size-selectivity and single-nanoparticle trapping. a, Sulforhodamine (SR)-101 molecules (molecular weight ~607) and 35-nm quantum dots were introduced into the inlet. b, Without force, fluorescence increased as a result of co-transport of SR and quantum dots. c, Channel deformation by 22 kPa prohibits the transport of quantum dots and retards the movement of SR. d, When compressed with 42 kPa, the nanochannels hinder the transport of both species, as evidenced by no measurable increase in fluorescence. e, A single 20-nm quantum dot travelling along a relaxed nanochannel. f, Channel deformation at 42 kPa traps the particle. g, Release of applied force resumes the flow of carrier liquid and the motion of the quantum dot.
Figure 4:
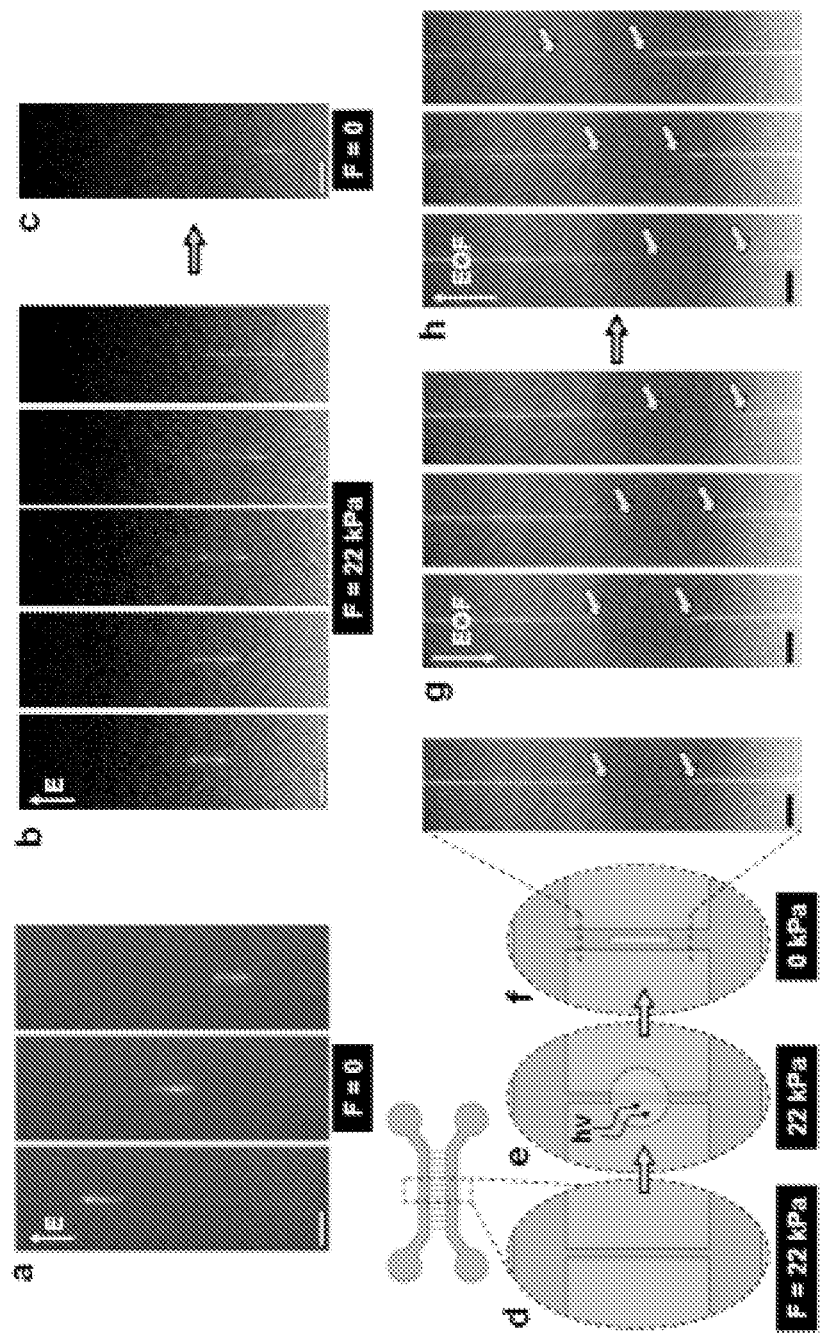
FIG. 4 shows DNA manipulation and in situ fabrication of moveable nanostructures. a, Electrophoretic migration of a partially extended 48.5 kbp-long λ-phage DNA in a relaxed nanochannel by 34.5 V/cm (time interval between frames=0.8 s). E represents electric field. b, Channel deformation at 22 kPa resulted in further stretching of the DNA to 13.6 μm at the same electric field (time interval between frames=0.6 s). c, Removal of compression after the electric field was switched off caused the DNA molecule to relax to its original length. d, The nanochannels are constricted by the compressive stress of 22 kPa. e, A target area is selectively polymerized by UV. Subsequently, strong illumination photobleaches the polymerized region. f, Restoration of the channel size releases the polyacrylamide nanofilament. g, The nanofilament is manipulated to move along the nanochannel by electroosmotic flow (EOF). h, The motion is reversed when the direction of electroosmotic flow changes.

To facilitate an understanding of the present invention, a number of terms and phrases are defined below:

As used herein, the term "sample" is used in its broadest sense. In one sense, it is meant to include a specimen or culture obtained from any source, as well as biological and environmental samples. Biological samples may be obtained from animals (including humans) and encompass fluids, solids, tissues, and gases. Biological samples include blood products, such as plasma, serum and the like. Environmental samples include environmental material such as surface matter, soil, water, crystals and industrial samples. Such examples are not however to be construed as limiting the sample types applicable to the present invention.

As used herein, the term "cell" refers to any replicatable bio-organic material. In some embodiments, cells are eukaryotic or prokaryotic cell (e.g., bacterial cells such as E. coli, yeast cells, mammalian cells, avian cells, amphibian cells, plant cells, fish cells, and insect cells), whether located in vitro or in vivo. In some embodiments, cells include mycoplasma, viruses, prions, etc.

As used herein, the term "cell culture" refers to any in vitro culture of cells. Included within this term are continuous cell lines (e.g., with an immortal phenotype), primary cell cultures, transformed cell lines, finite cell lines (e.g., non-transformed cells), and any other cell population maintained in vitro.

As used, the term "eukaryote" refers to organisms distinguishable from "prokaryotes." It is intended that the term encompass all organisms with cells that exhibit the usual characteristics of eukaryotes, such as the presence of a true nucleus bounded by a nuclear membrane, within which lie the chromosomes, the presence of membrane-bound organelles, and other characteristics commonly observed in eukaryotic organisms. Thus, the term includes, but is not limited to such organisms as fungi, protozoa, and animals (e.g., humans).

As used herein, the term "in vitro" refers to an artificial environment and to processes or reactions that occur within an artificial environment. In vitro environments can consist of, but are not limited to, test tubes and cell culture. The term "in vivo" refers to the natural environment (e.g., an animal or a cell) and to processes or reaction that occur within a natural environment.

The terms "test compound" and "candidate compound" refer to any chemical entity, pharmaceutical, drug, and the like that is a candidate for use to treat or prevent a disease, illness, sickness, or disorder of bodily function. Test compounds comprise both known and potential therapeutic compounds. A test compound can be determined to be therapeutic by screening using the screening methods of the present invention.

As used herein, the term "processor" refers to a device that performs a set of steps according to a program (e.g., a digital computer). Processors, for example, include Central Processing Units ("CPUs"), electronic devices, or systems for receiving, transmitting, storing and/or manipulating data under programmed control.

As used herein, the term "memory device," or "computer memory" refers to any data storage device that is readable by a computer, including, but not limited to, random access memory, hard disks, magnetic (floppy) disks, compact discs, CDs, DVDs, magnetic tape, flash memory, and the like.

As used herein, the term "compliant," for example when used in reference to a substrate for forming nanochannels, refers to a material that is easily and reversibly deformed (e.g., has a low modulus or a relatively high strain to failure). Examples of compliant materials include, but are not limited to, bulk PDMS.

As used herein, the term "stiff," for example when used in reference to a layer for forming nanochannels, refers to a material that is not easily deformed (e.g., has a higher modulus, has a low strain to failure, or is brittle). Examples of stiff materials include, but are not limited to, oxidized PDMS and metals.

DETAILED DESCRIPTION

The invention relates to tunable elastomeric nanochannels for nanofluidic manipulation. In particular, the present invention relates to nanochannels for performing biological assays.

In some embodiments, the present invention provides the use of nanoscale fracturing of oxidized poly(dimethylsiloxane) (PDMS) to fabricate nanofluidic systems with arrays of nanochannels that can actively manipulate nanofluidic transport through dynamic modulation of the channel cross-section.

I. Systems

In some embodiments, the present invention provides systems comprising tunable nanochannels and one or more biological molecules. In some embodiments, nanochannels are formed in PDMS. The below description describes exemplary, non-limiting systems and methods. One skilled in the art recognizes that additional materials and applications are within the scope of the present invention.

A. Nanochannels

In some embodiments, nanochannels are formed in PDMS. Polydimethylsiloxane (PDMS), a clear elastomer, is a very common material used in a myriad of applications in bioengineering, electronics, and MEMS. PDMS is widely used because it is cheap, easy to mold, biologically inert, and it is an insulator. However, for applications where laminar flow or wetting of fluids is desired, the inherent hydrophobicity of the PDMS surface is not ideal. Therefore, the surface of PDMS is often made hydrophilic by oxidation techniques which emulate environmental exposure (Fritz and Owen *Journal of Adhesion* 54(1-2): 33-45 1995; Hillborg and Gedde *IEEE Transactions on Dielectrics and Electrical Insulation* 6(5): 703-717 1999), only in an expedited manner. In addition to changing the surface chemistry, oxidation creates a stiff, thin surface-modified layer (Bowden et al. *Appl. Phys. Lett.* 75, 2557-2559 1999; Hillborg et al. *Polymer* 41(18): 6851-6863 2000; Efimenko et al. *Nature Materials* 4(4): 293-297 2005). The oxidized PDMS exhibits mechanical behaviors that are characteristic of elastically-mismatched layered materials, but at the nano-scale. Specifically, moderate uniaxial tensile strains (for an elastomer) produce periodic parallel cracks in the stiff surface-modified layer (Zhu et al. *Nature Materials* 4(5): 403-406 2005), and compressive strains induce surface buckling (Bowden et al. 1999, supra).

In some embodiments, fabrication of the elastomeric nanochannels begins with mechanical stretching of plasma-oxidized PMDS to generate an orderly array of nanoscale cracks, which are replicated onto UV-curable epoxy. In some embodiments, a substrate having recessed nanochannels is prepared by casting PDMS prepolymer against the epoxy master. In some embodiments, the production parameters of crack patterning is adjusted to create pre-sealed nanochannels having the shape of an isosceles triangle. In some embodiments, the PDMS substrate is then oxidized and brought into conformal contact with a flat slab of oxidized PDMS to yield an array of tightly sealed nanochannels. In other embodiments, bonded films of gold are used to fabricate nanochannels and nanopores.

In some embodiments, the following steps are utilized to encourage complete sealing and reversible functionality of nanochannels: (i) a brief oxidation of the PDMS before the bonding, (ii) the use of the epoxy master, and (iii) the use of a relatively stiff PDMS to prevent irreversible channel collapse. A thin oxidized layer provides surface compliance for sealing. For cracking, however, a thick oxidation layer can help obtain larger cracks. In some embodiments, an epoxy master is used in the intermediate step to satisfy each of these conditions.

In some embodiments, nanochannels formed by cracking have a triangular cross-section in which channel closure proceeds gradually from the corners. This is in contrast to rectangular channels that close by a sudden yet partial collapse at the middle.

In some embodiments, substrates comprise at least one stiff thin film (e.g., a metal such as gold or oxidized PDMS) sandwiched by one or more compliant materials (e.g., unoxidized bulk PDMS).

The nanochannels of embodiments of the present invention are straightforward to fabricate and provide a versatile example of an active nanostructure that can change its architecture during operation to create, control, and manipulate various types of nanofluidic transport.

In some embodiments, the nanofluidic system consists of a parallel array of nanochannels made of poly(dimethylsiloxane) (PDMS). In some embodiments, fluid flows are driven by an electric field applied between the inlet and outlet compartments, by pressure driven flow, or by gravity. The channel geometry and materials mechanics are optimized so that the cross-sectional size of the nanochannels can be reversibly modulated in response to compressive forces applied perpendicular to the nanochannels. Since the nanochannels only allow the passage of molecules or nanoparticles that are smaller than their cross-section, the magnitude of applied force can be varied to choose subpopulations in a polydisperse mixture that can pass through the nanochannels. For example, the size of non-deformed nanochannels supports co-transport of larger and smaller particles. Moderate channel deformation at low levels of applied force, however, hinders larger particles from entering the nanochannels and allows selective transport of the smaller particles. Further increase in the applied force causes the nanochannels to shut closed, excluding sample particles. This adjustability permits manifold modes of nanofluidic transport within a single device for a given sample population. Channel deformation can also be used to trap nanoparticles already inside the nanochannels by mechanically constraining their movement. When the applied force is removed, recovery of flow prompts trapped nanoparticles to resume their movement along the nanochannels.

In some embodiments, in-channel photopolymerization of filamentous polyacrylamide nanostructures that can be actuated to move through the nanochannels is utilized. Relaxed nanochannels are filled with acrylamide/bisacrylamide monomer solution mixed with photoinitiator and fluorescein. The nanochannel cross-section is then reduced using applied stress and UV light is irradiated onto a small area spanning along the channel length to induce localized photopolymerization. Subsequently, fluorescein in the exact same region is selectively photobleached by strong illumination to facilitate imaging of the polymerized gel. Finally, the nanochannel is unloaded of compression to recover its original size, creating a polymerized polyacrylamide nanofilament "floating" inside the nanochannel. Electroosmotic flows cause the nanofilaments to slide along the nanochannels and the direction of the movement can be manipulated by switching the polarity of electric field. This approach provides unique capabilities to fabricate nanoscale moving parts whose minimum feature size is limited only by the size of nanochannels, offering competitive advantages over conventional photolithography or hydrogel-based fabrication platforms.

In some embodiments, the present invention further provides systems and kits comprising the microfluidic devices described herein. In some embodiments, systems comprise additional components (e.g., detection components, components for migrating biological molecules or other components through nanochannels, test compounds, and control reagents).

II. Applications

The compositions and methods of the present invention find use in a variety of applications in the biological and chemical sciences. Exemplary applications are described below.

B. DNA Sequencing

In some embodiments, the compositions and methods described herein find use in DNA sequencing. Existing methods of DNA sequencing can only "read" short strands of up to a few thousand nucleotides at most. These short reads can be stitched together to provide many general sequencing needs, however, they limit the ability to perform accurate haplotyping and the short read sequencers tend to miss small structural changes in DNA, such as deletions or inversions of short sequences, which play a significant role in human variability. New methods of DNA sequencing are being developed especially for sequencing of longer DNA strands. DNA sequencing can be performed, for example, by reading the optical characteristics of short probes (e.g. 5 base-pair binding fluorescent probes) bound to longer strands of DNA. What is needed then, is to linearize the probe bound DNA so that the order of optical reads will correspond to the sequence of a given DNA molecule. One useful way to linearize DNA is by nanoconfinement. A challenge is that good linearization requires very narrow channels but as the DNA becomes longer and larger, the DNA becomes more and more difficult to introduce into the narrow channels.

The present invention overcomes this problem by using channels that have adjustable cross-sections. Using this method, probe bound DNA is introduced into wide cross-section channels while the DNA is still coiled or partially coiled, then, the channel cross-section can be decreased to confine DNA allowing further stretching out of the DNA upon application of an external force such as an electric field. Because the DNA is already within the nanochannel, there is no barrier for DNA entry into the nanochannels. The DNA is then stretched out while in the same channel.

B. Single Molecule Cytogenetics

In some embodiments, the compositions and systems of embodiments of the present invention find use in single molecule cytogenetics. In some embodiments, the compositions and systems of embodiments of the present invention find use in DNA stretching. In order to stretch out DNA, it has to be elongated from its ordinary, high-entropy state where it is complexly coiled and looped. In some embodiments, the size of the channels is smaller than the persistence length of DNA (about 50 nm) to cause stretching. DNA molecules do not readily move into nanochannels but get stuck at the beginning of the channel region. A variety of methods have been devised to overcome this barrier such as the use of nanopost arrays to partially pre-stretch DNA. However, there is still a barrier and this can be a problem for analysis of small number of precious DNA molecules.

The present invention overcomes this problem by using channels that have adjustable cross-sections. Using this method, DNA can be introduced into wide cross-section channels while the DNA is still coiled or partially coiled, then, the channel cross-section can be decreased to cause stretching out of the DNA. Because the DNA is already within the nanochannel, there is no barrier for DNA entry into the nanochannels. The DNA is then stretched out while in the same channel.

In order to stretch DNA, nanochannels, as opposed to nanoslits, which only constrain DNA in two dimensions, are preferred. The above described devices and systems create arrays of nanochannels readily.

During experiments conducted during the course of development of embodiments of the present invention, fluorescently labeled λ-phage DNA (48.5 kbp) in nanochannels was stretched to ~5.6 μm, which is approximately 30% of its fully stretched length. Once partially stretched, the DNA molecules traveled down the nanochannels in an electrophoretic fashion without any significant change in their length. When the channel size was reduced by applying 22 kPa of pressure, however, the migration was initially replaced by further elongation of the DNA presumably due to the reduction in entropy. Additional stretching was achieved by selective electrophoretic movement of the downstream end with little movement of the upstream end. The DNA continued its extension until it reached an equilibrium length of ~13.6 μm, after which time the entire length of the molecule resumed its uniform electrophoretic motion. When the compressive force was removed, the stretched DNA strand shrank to its original extended length in less than one minute as a result of entropic relaxation in the non-deformed nanochannel.

Stretched DNA may be directly analyzed or may be first exposed to reagent (e.g. dyes, probes, primers, nucleic acid modifying enzymes, polymerases, single stranded binding proteins) or other reaction conditions (e.g., temperature changes, crosslinking conditions, chemical modification, or surface attachment) in the channels or in reaction chambers after leaving channels.

In other embodiments, other biopolymers are studied at the single molecule level (e.g., proteins, RNA, chromatin, etc.).

C. Polymer Separation

In some embodiments, the present invention provides methods for the separation of polymers. Separation of polymers relies on differences in the ability of polymers to enter nanochannels. Thus, it utilizes entropic barriers between larger regions and smaller nanochannels. Fracture fabrication can easily provide this type of structure as well. By bonding PDMS structures of periodic grooves such as optical diffraction grating type structures to a flat surface via plasma oxidation, then stretching, one can create an array of nanochannels separated by wider regions and can be used for molecular level separations by polymer size.

D. Cell Growth

In some embodiments, the present invention provides systems and methods for cell growth. Under in vivo conditions, cells exist in a complex three dimensional matrix comprised of proteoglycans, adhesion proteins, and other proteins providing mechanical support and stability to tissue. Traditional cell culture platforms are limited because the two dimensional growth pattern and static conditions fail to replicate these complex interactions. In some embodiments, the present invention provides systems that more closely replicate in vivo conditions by patterning cells onto protein-coated cracks of a similar scale to focal adhesion complexes (500-3,000 nm) and exposing them to mechanical forces. As these matrices dynamically expand and contract cells exhibit a pattern of focal adhesion complexes characteristic of cells adhering to a 3D matrix. Protein matrices formed from patterned cracking also serve as a platform for in vitro cell culture studies offering the convenience and repeatability of traditional 2D culture platforms with interactions and responses characteristic of 3D matrices.

In some embodiments, devices are formed by patterning a thin layer of Cr—Au on the surface of a PDMS substrate. The Au-layer allows convenient methodology for cell patterning onto the formed cracks using self-assembled monolayers of alkanethiolates.

In some embodiments, cells grown on devices of the present invention are exposed to test compounds. For example, in some embodiments, disease (e.g., cancer) cells are exposed to test compound and their affect on cell growth or viability is assayed.

In some embodiments, a part of a cell, such as cellular extensions from neurons or osteoblasts, are introduced into nanochannels. Then fluid is then allowed to flow through the nanochannels or the nanochannel cross sectional shape is altered to exert a squeezing effect on the thin cellular extensions.

EXPERIMENTAL

The following examples are provided in order to demonstrate and further illustrate certain preferred embodiments and aspects of the present invention and are not to be construed as limiting the scope thereof.

Example 1

Methods

Generation of nanocrack patterns: PDMS (Sylgard 184, Dow Corning) base and curing agent were mixed at a weight ratio of 10:1. Degassed PDMS prepolymer was cast against a photolithographically-prepared SU8 (SU8-50, MicroChem Corp.) mold and cured at 60° C. for 4 hours to produce PDMS substrates with recessed inlet and outlet microchannel features. The substrates were then cleaned with adhesive tape and treated with oxygen plasma for 4 minutes in a bench-top plasma etcher (Plasma Prep II, SPI Supplies). Vacuum pressure and operation current used for plasma treatment were 150 mTorr and 30 mA, respectively. Subsequently, the oxidized PDMS surface was stretched to a strain of 5~10% for 10 seconds by an electronically controlled stretcher (ST140, STREX Inc.) to create nanocracks.

Figure 5:
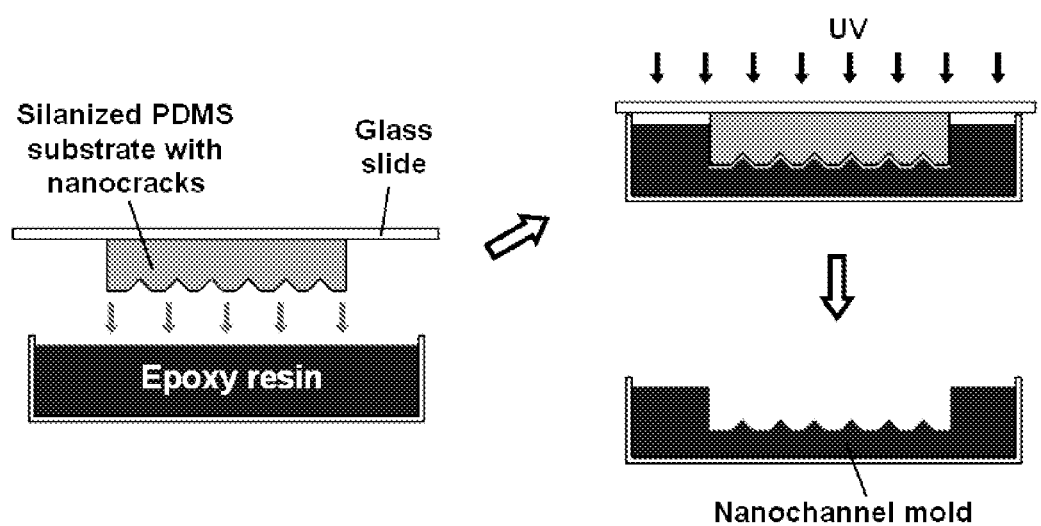
FIG. 5 shows fabrication of nanochannel molds.

Fabrication of nanochannel molds: The PDMS surface with nanocracks was silanized with (tridecafluoro-1,1,2,2-tetrahydrooctyl)-1-trichlorosilane for 1.5 hours in a vacuum desiccator. Nanochannel molds were prepared by casting an epoxy resin (Epo-tek, Dow Corning) against the silanized nanocrack patterns, as shown in FIG. 5. Photo-curing of an epoxy resin was performed for 1.5 hours in a custom-built UV exposure chamber.

Fabrication of sealed elastomeric nanochannels: PDMS nanochannels were fabricated by curing PDMS prepolymer with a base-to-curing agent ratio of 3:1 against the epoxy master at 60° C. for 4 hours. The cured PDMS substrates were peeled off the mold and further incubated at 150° C. overnight to ensure complete cross-linking Reservoirs for the inlet and outlet microchannels were created by punching holes through the channel PDMS slabs using blunt syringe needles with sharpened edges. The PDMS substrate having negative relief patterns of nanochannels was treated with oxygen plasma for 1 minute at a vacuum pressure of 300 mTorr and sealed against a flat PDMS slab oxidized under the same plasma treatment conditions to generate enclosed elastomeric nanochannels.

Figure 6:
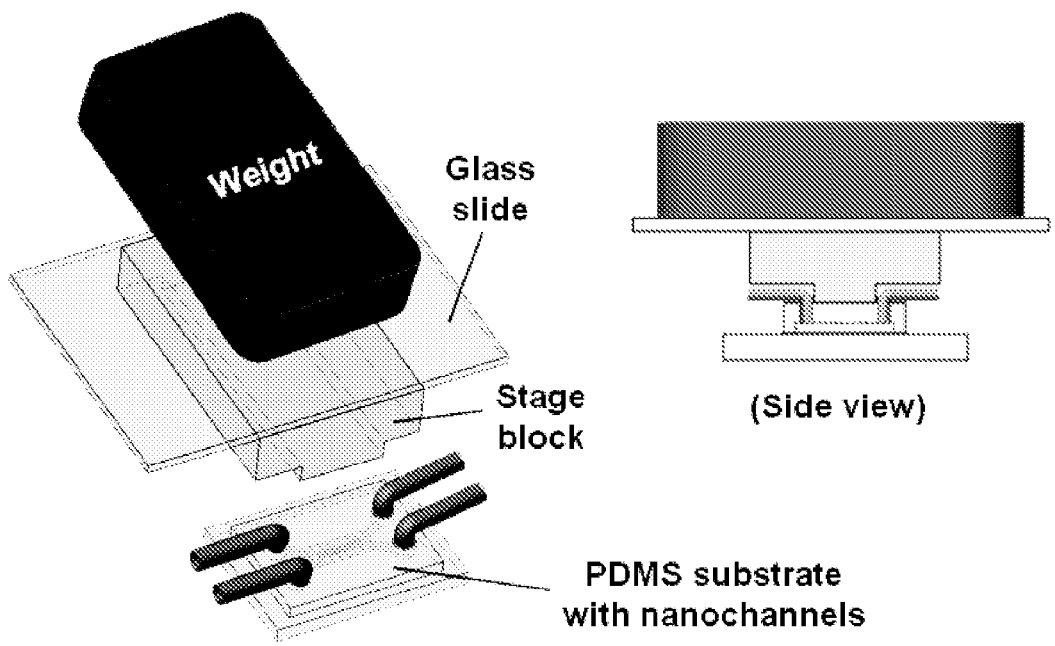
FIG. 6 shows uniform compressive forces imposed on nanochannels by putting rectangular weights on a custom-designed glass plate sitting on top of a channel-containing PDMS substrate.

Application of compressive stress to nanochannels: As depicted in FIG. 6, uniform compressive forces were imposed on the nanochannels by putting rectangular weights on a simple custom-designed glass plate sitting on top of a channel-containing PDMS substrate. The magnitude of compressive forces applied to the nanochannels was varied by changing the number of weights.

Preparation of DNA samples: λ-phage DNA was obtained from New England Bio Laboratory and stained with the intercalating dye YOYO-1 at the concentration of 10 base pairs/1 dye molecule. DNA was then diluted to 50 pg/μL in 10× Tris-borate EDTA (TBE) buffer. β-mercaptoethanol (5% v/v) was added to prevent photobleaching of the DNA molecules and electroosmotic flows were suppressed by the high concentration of TBE buffer.

Preparation of fluorescent acrylamide solution: The acrylamide monomer solution was prepared by using the commercial ReproGel system purchased from Amersham Pharmacia. A solution containing 200 μL of acrylamide/bisacrylamide monomers was mixed with 300 μL of photoinitiator solution. Sodium periodate ($NaIO_4$) was added at the concentration of 10 mM as a scavenger of oxygen that tends to inhibit photopolymerization. 120 L of the solution was mixed with 1 μL of fluorescein (0.2 mg/mL in DI water) and evacuated for 2 hours immediately before use in the nanochannels.

Finite-element model for numerical simulations: Finite-element calculations were performed to study the energy of the nanochannel system as bonding proceeds. When two surfaces are in proximity to each other, whether they bond or not depends on the difference in total energy between the bonded and unbonded states. This energy is the difference between the elastic energy of deformation associated with the bonding, and the surface energy released by mating the two surfaces.

$$U_{total} = U_{elastic} - U_{surface\ energy}$$

Figure 7:
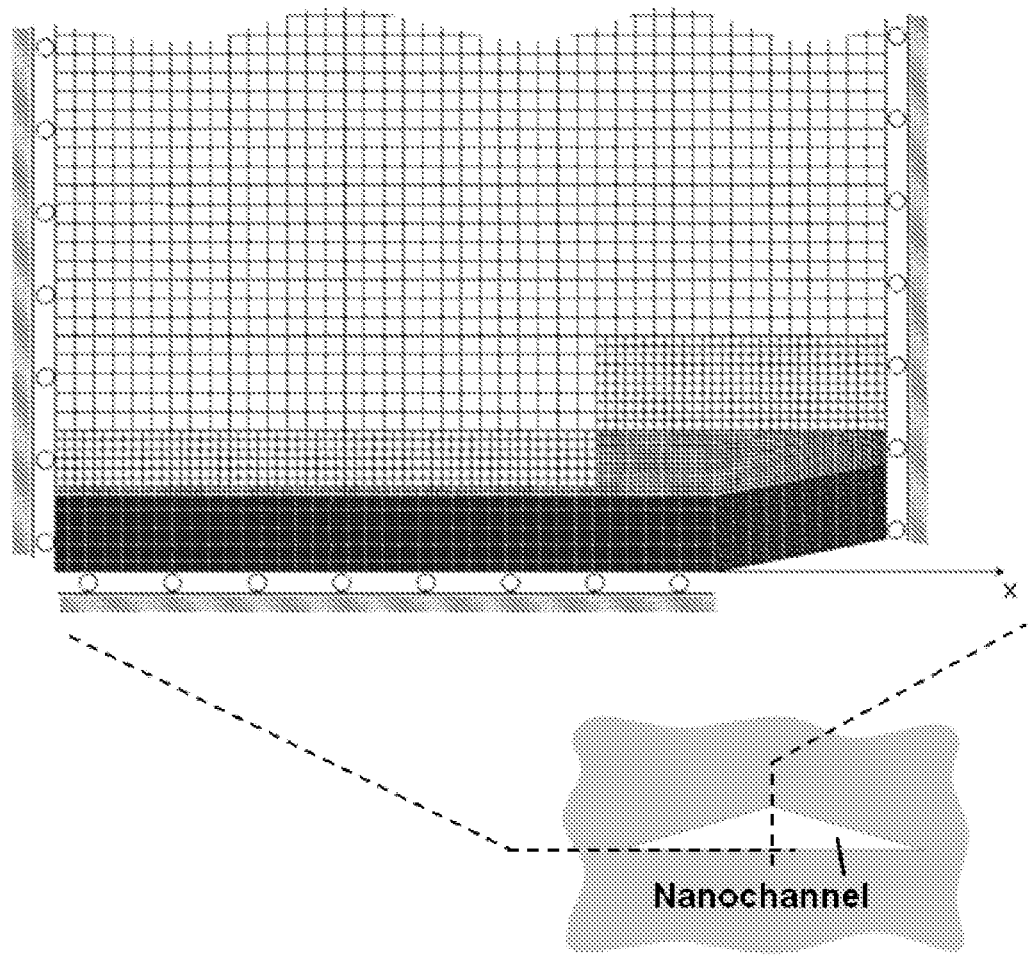
FIG. 7 shows plane-strain hyperelastic finite-element analyses run using the finite-element package ABAQUS.
Figure 8:
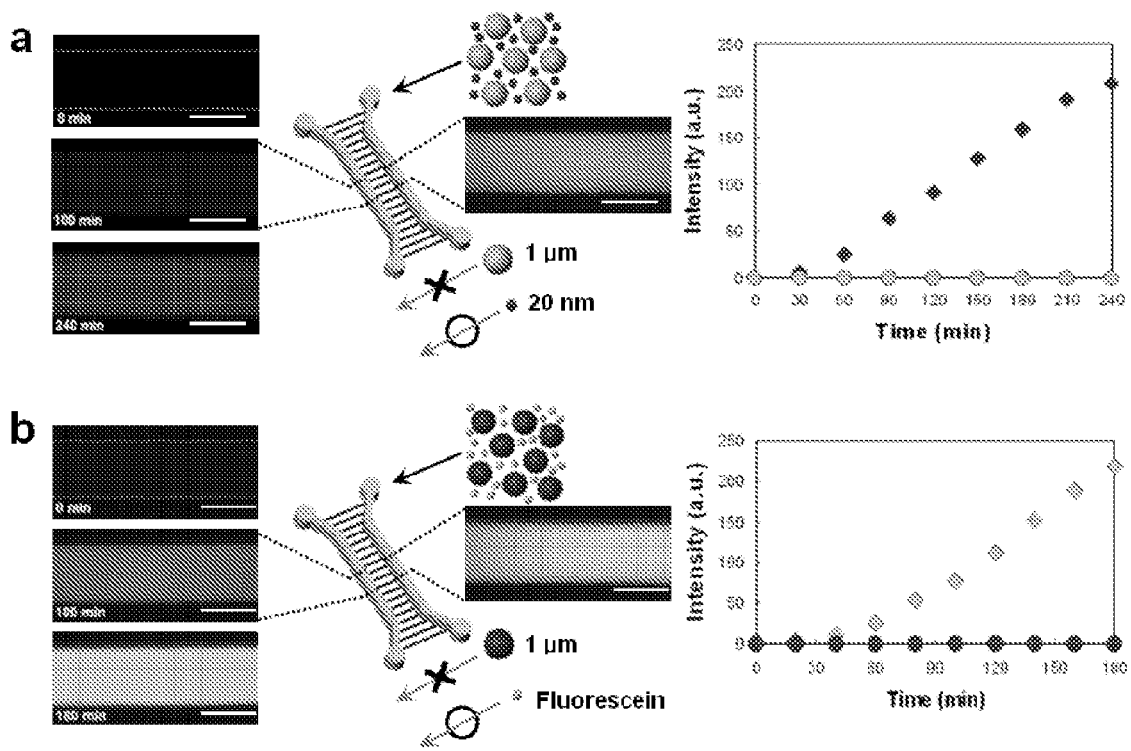
FIG. 8 shows examples of simple size-selective nanofluidic transport without mechanical deformation of elastomeric nanochannels. a, A mixture of green fluorescent polystyrene microspheres (diameter=1 nm) and carboxylate-modified red fluorescent beads (diameter=20 nm) is filtered through nanochannels. b, Selective transport of fluorescein molecules initially mixed with 1-nm red fluorescent microspheres.
Figure 9:
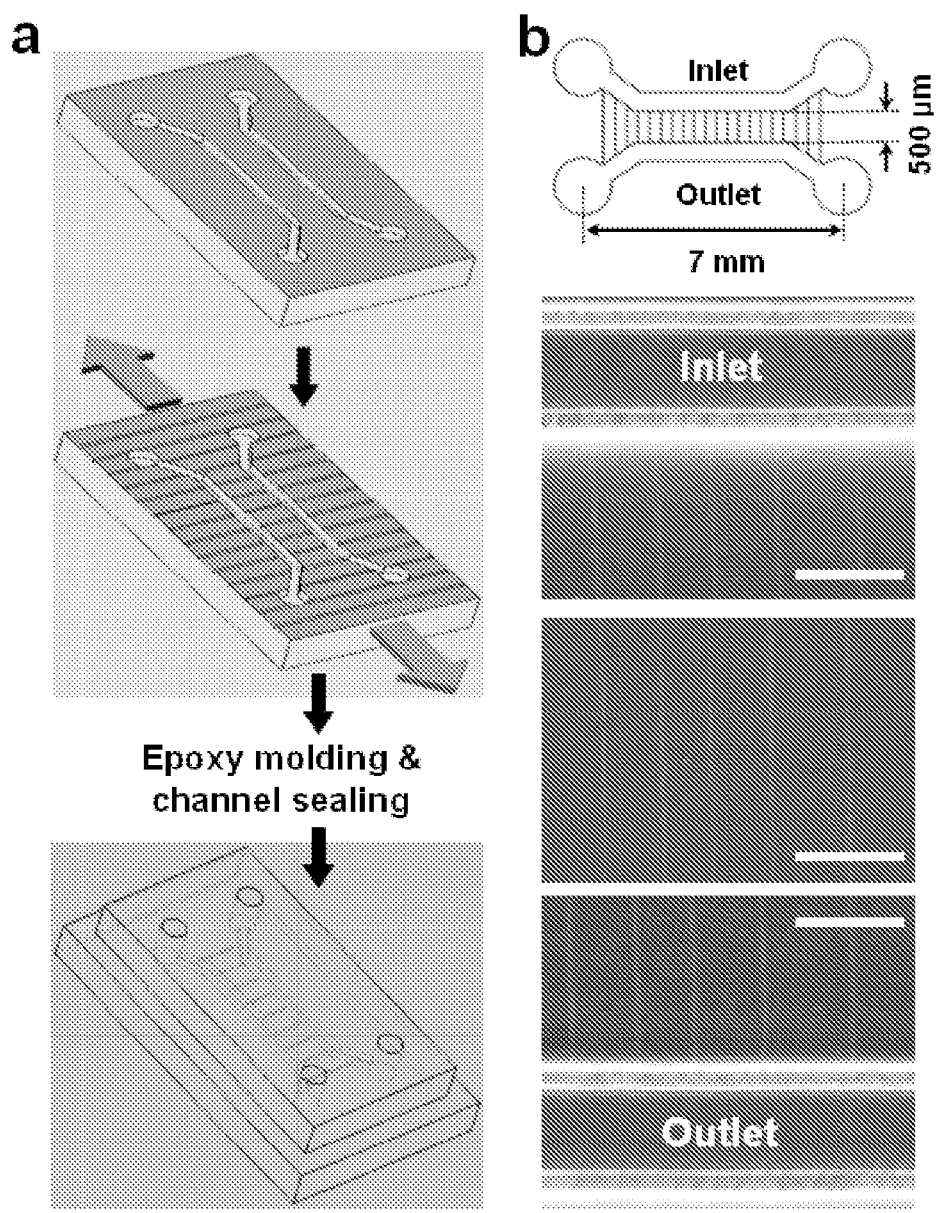
FIG. 9 shows fabrication of elastomeric nanochannels integrated with microscale inlet and outlet compartments. a, A PDMS surface with recessed microchannel features that are 100 nm in width and 50 nm in height is prepared by casting PDMS prepolymer against a photolithographically-fabricated mold. b. Channel arrays consist of 100~700 nanochannels over 7 mm.
Figure 10:
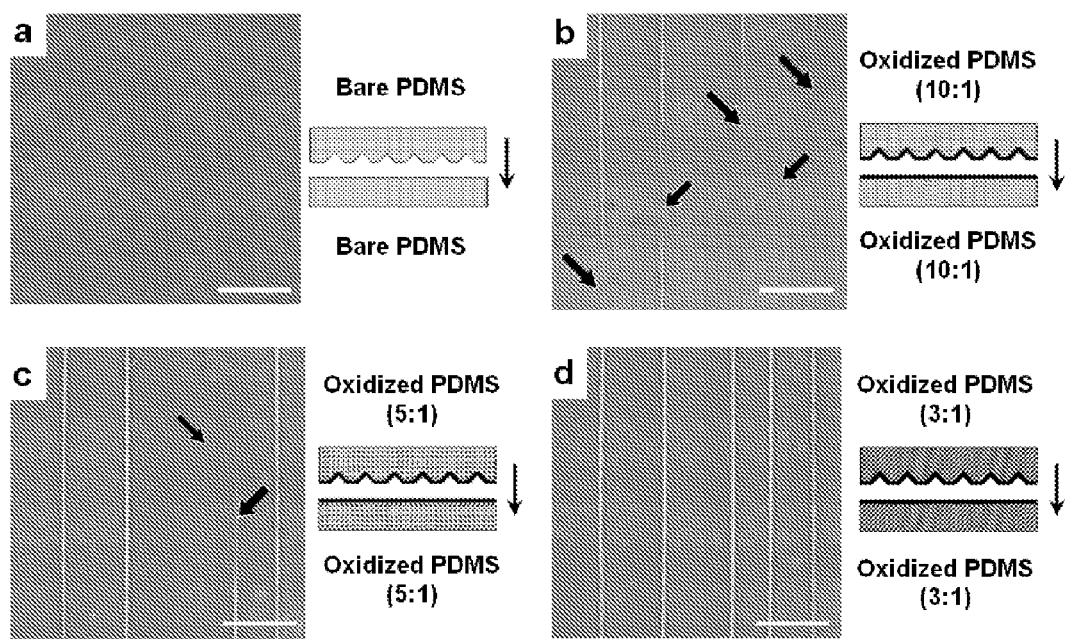
FIG. 10 shows the effect of PDMS stiffness on irreversible collapse of nanochannels. a, Conformal contact between bare PDMS surfaces without oxidation causes the nanochannels to collapse irreversibly. b, Plasma oxidation modifies PDMS to form a thin, silica-like layer on the surface. c, A smaller number of partially collapsed nanochannels are observed as the stiffness of PDMS increases. d, Optimal sealing without unwanted channel collapse is achieved by using oxidized 3:1 PDMS surfaces.
Figure 11:
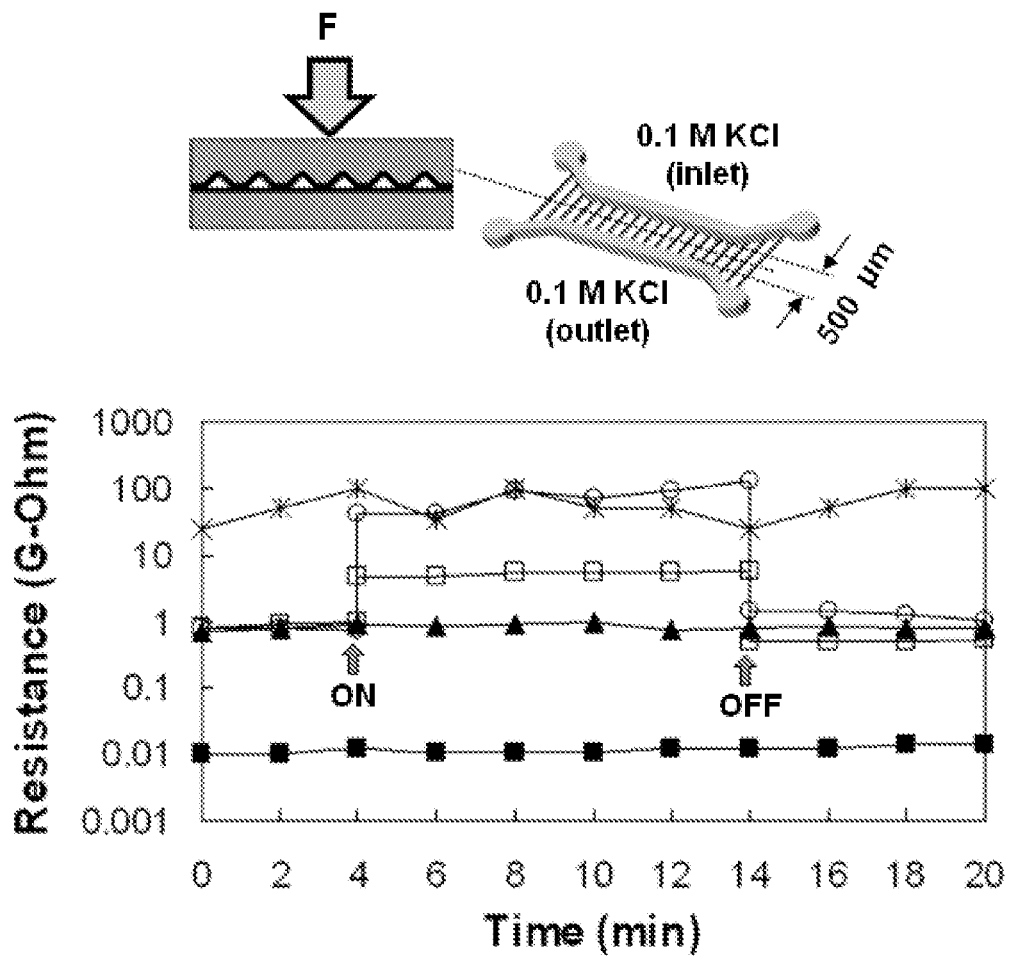
FIG. 11 shows electrical resistance measurements under different compressive stress conditions.
Figure 12:
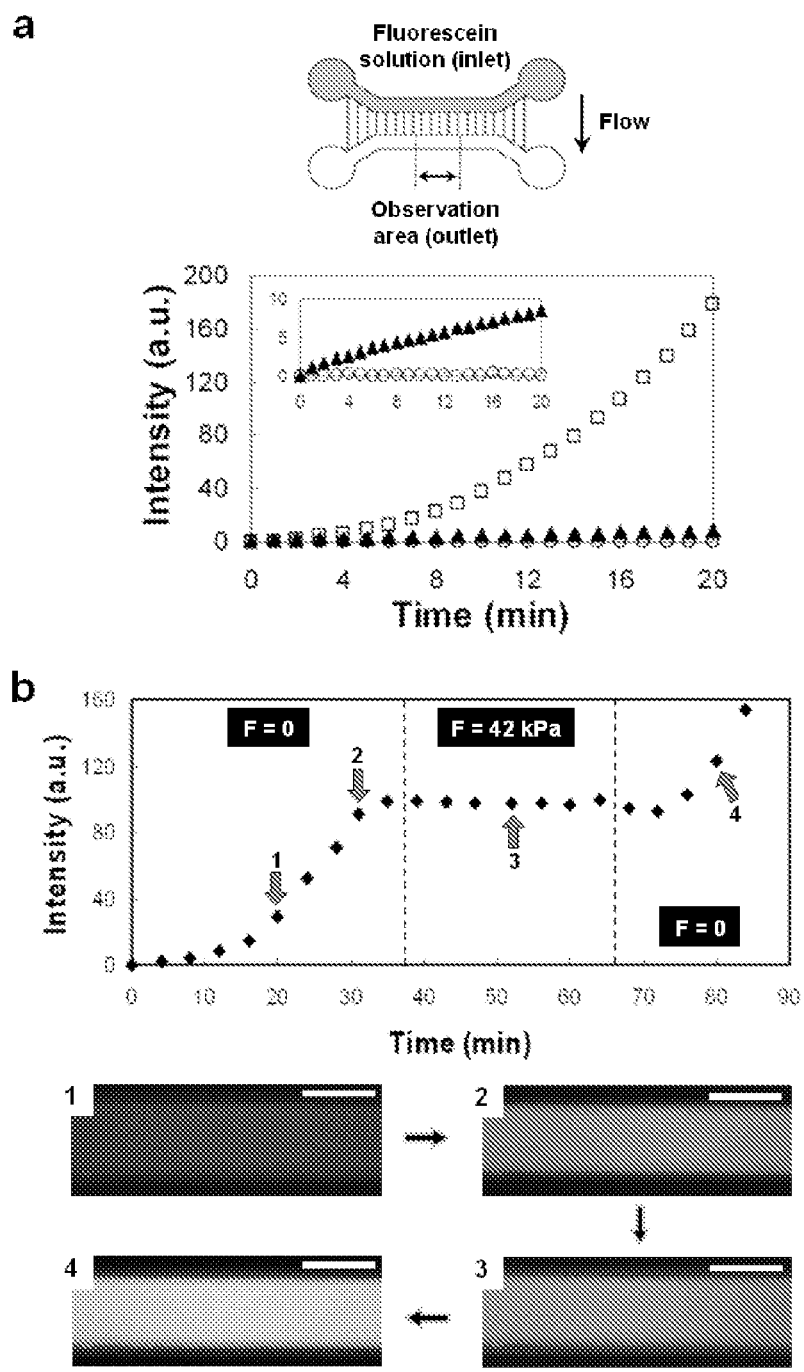
FIG. 12 shows force-induced modulation of molecular transport. a, Transport of fluorescein molecules through water-filled nanochannels with different cross-sectional areas was characterized by measuring fluorescence signals from fluorescein accumulation in the observation area at the outlet. b, Nanofluidic valving of fluorescein transport through reversible deformation of the channel cross-section.
Figure 13:
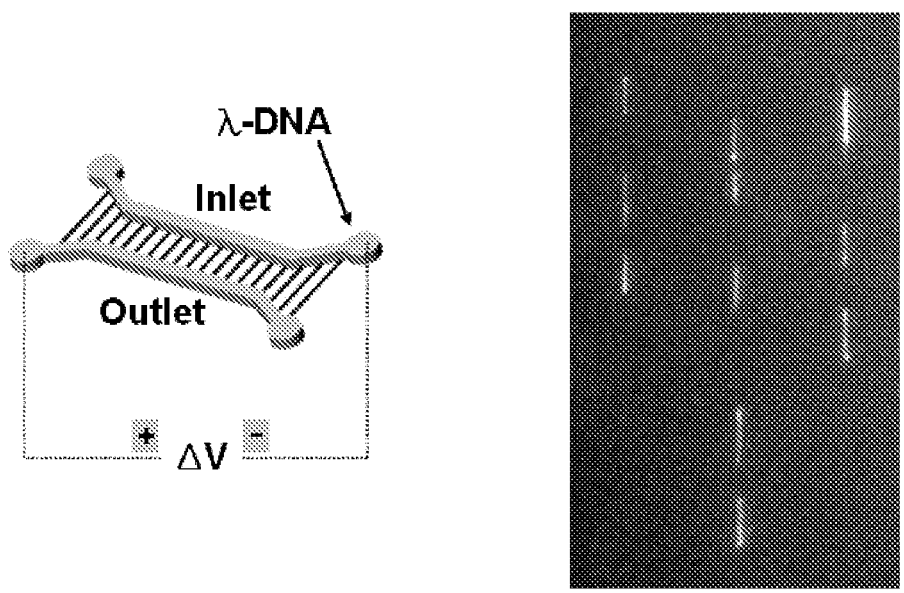
FIG. 13 shows stretching of DNA in relaxed nanochannels.

The symmetry of the nanochannel problem was taken advantage of in creation of the finite-element mesh. A quarter-model of the geometry (corresponding to experimental AFM measurements) was used with appropriate symmetric boundary conditions as illustrated in FIG. 7.

Plane-strain hyperelastic finite-element analyses were run using the finite-element package ABAQUS. At many intermediate extents of bonding (c/a), the deformation energy, $U_{elastic}$, was calculated as $$\int_0^c \frac{1}{2} P(x) h(x) dx,$$

the integral over the length of closure (c) of the load necessary to close the nanochannel times the height of the nano-channel. At the same intervals, the surface energy released, $U_{surface\ energy}$, was calculated as $2c\gamma$.

Equipment and settings: A CCD camera (Hamamatsu ORCA-ER) mounted on an epi-fluorescence microscope (Nikon TE-300) and SimplePCI 5.2 (Compix Inc.) was used as an image acquisition device and software. Image depth was 8 bit for all images.

Example 2

Nano-Cracking of the Surface-Modified Layer of Poly(Dimethylsiloxane) Created by Exposure to Plasma Oxygen This example describes an investigation of the material properties of plasma-oxidized PDMS. The properties of the PDMS are straightforward to determine with established experimental methods, and are presented in Section 2. Addressing the challenge of assessing the material properties of the surface-modified layer, Section 3 demonstrates a two-step method, using the AFM, to determine its thickness and elastic modulus. Finally, in Section 4 the fracture behavior of a surface-modified layer is discussed in the light of the measured material properties.

2 Materials Preparation and Properties of the Bulk PDMS 2.1 Materials Preparation Initial studies showed that both the ratio of the polymer to the curing agent, and the curing schedule affected the constitutive behavior of the resulting elastomer. Therefore, care was taken to ensure that all experiments were performed with PDMS that was produced using the same mixing and curing parameters. In particular, Dow Corning (Sylgard 184) PDMS was prepared with a ratio of 10 parts of polymer to 1 part of curing agent. The liquid polymer was poured into glass Petri dishes, and then cured at 60° C. for three hours followed by 12 hours at 150° C. The resulting thickness of the PDMS sheets used throughout this study was 2.0±0.2 mm.

The PDMS was oxidized by exposing the cured sheets to an oxygen plasma in the chamber of a plasma etcher. A maximum power of 100 W was used for a period of four minutes with a pure oxygen environment at a relative vacuum of about 300 mtorr. In the results that follow, it will be indicated when comparisons are being made between specimens oxidized together or in separate runs.

2.2 Constitutive Properties of the Bulk PDMS

Figure 14:
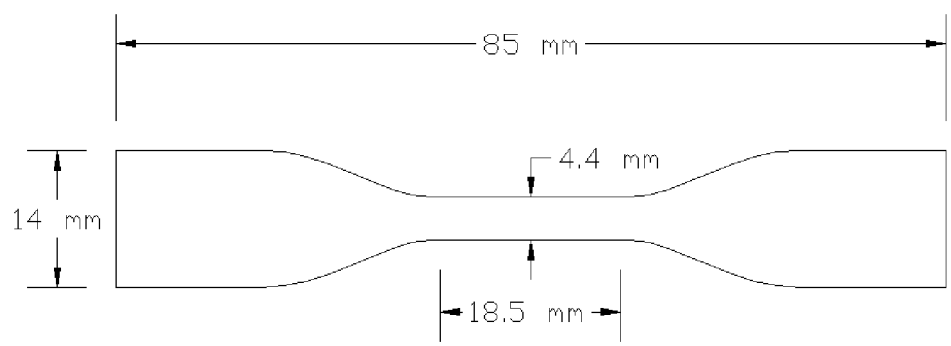
FIG. 14 shows a tensile specimen for the determination of the constitutive properties of the bulk PDMS material.

The constitutive behavior of the PDMS was measured with tensile tests. Tensile specimens were sliced from the cured sheets of PDMS in the dog-bone shape of dimensions shown in FIG. 14. An initial gage length of 18.5 mm was drawn on the specimen, and the specimen clamped in wedge grips. The tensile tests were performed at a constant displacement rate of 1 mm/sec, and the load was measured using a 250 N load cell. The nominal stress was calculated as the load divided by the original cross-sectional area. A CCD optical camera was used to capture images of the deformed gage length at regular intervals throughout the experiment, which were used to compute the nominal strains.

Figure 15:
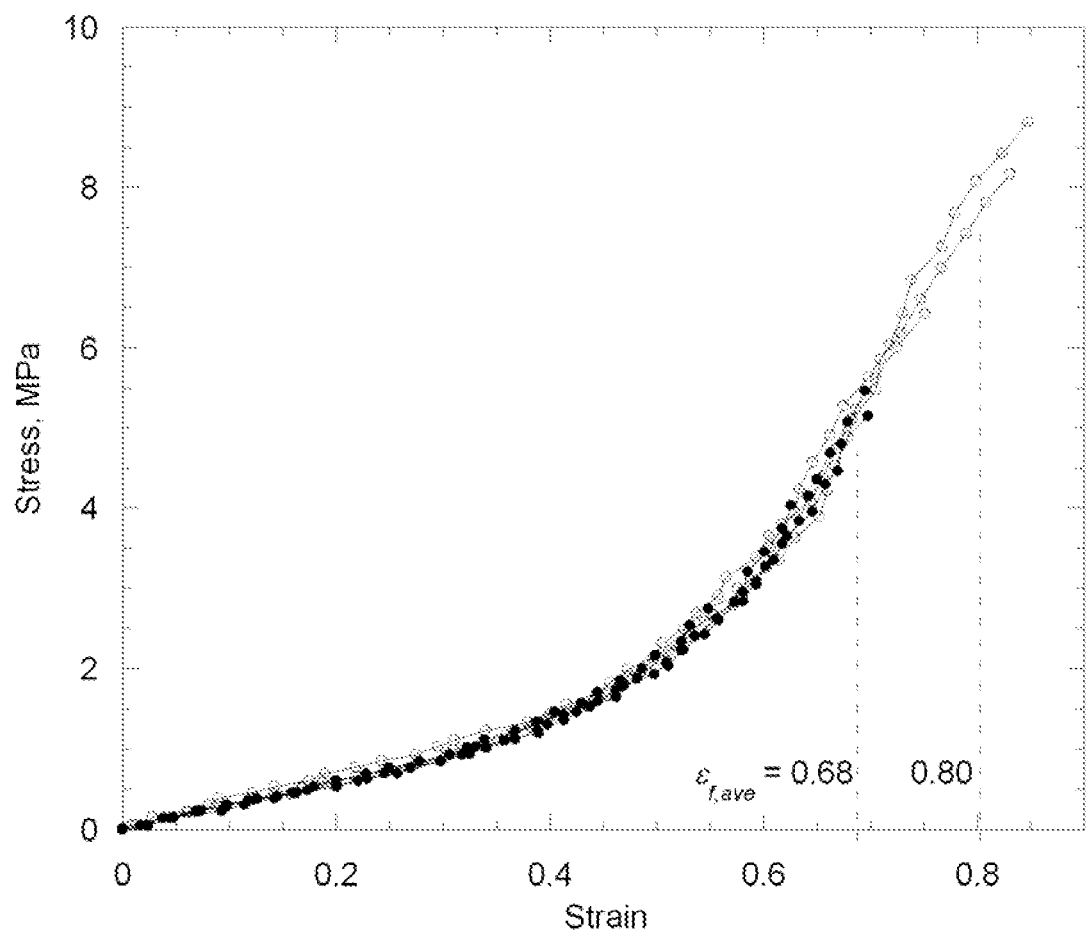
FIG. 15 shows a range of nominal stress versus strain curves obtained from the tensile experiments performed on the bulk PDMS.

A typical nominal stress-strain curve obtained from the PDMS tensile experiments is shown in FIG. 15. Although the stress-strain curve was sensitive to the curing conditions, it was very reproducible for a given set of conditions. The behavior of the elastomer was non-linear elastic; no hysteresis could be detected upon cyclic loading. Although the curve is non-linear, there is an initial linear portion up to about 30-40% strain. The linear-elastic modulus in this regime was determined to be 3.5±0.2 MPa. The tensile tests were repeated for specimens of the cured PDMS stored for prolonged periods at ambient conditions (in a laboratory, away from direct sunlight) and for specimens of the cured PDMS subjected to the four-minute oxidation treatment. The nominal stress-strain curves for all samples were identical, except for the oxidized samples where there was a slight decrease in the average failure strain from about 80% to about 70%. It is clear that the surface-modified layer was sufficiently limited in its extent that it did not affect the macroscopic properties beyond the slight decrease in failure strain, and that the cured PDMS was very stable.

2.3 Fracture Properties of the Bulk PDMS

Figure 16:
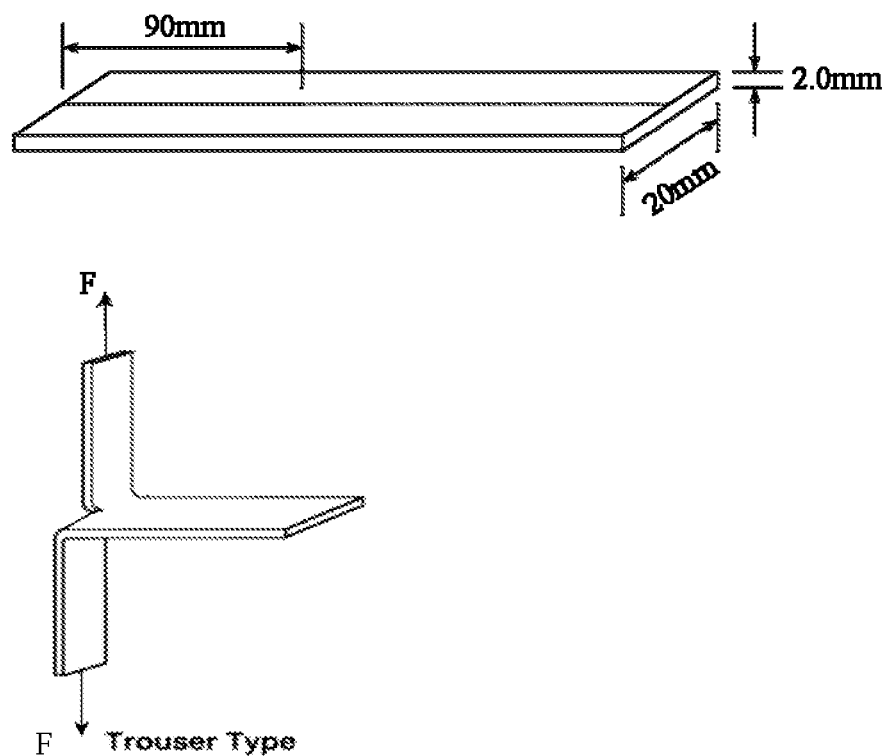
FIG. 16 shows trouser test specimen geometry and the arrangement of trouser specimen during loading.

Trouser specimens were sliced from the 2 mm-thick sheets of PDMS with an overall width of 20 mm and leg length of 90 mm (FIG. 16). The surface of the PDMS was scored along the projected crack path with a razor blade to ensure that the crack grew in the center of the legs and fracture remained as a tearing mode, deterred from transitioning to an opening mode. The specimens were loaded at a fixed displacement rate of 1 mm/sec. The load required to tear the PDMS, $F_t$, was monitored throughout the test and remained constant at 0.3±0.01 N during steady-state crack growth. From this tear load and the thickness, t, of the fractured surface (1.8±0.2 mm) the mode-III toughness was calculated as $\Gamma_{III}$=330±27 J/m² from the relationship $\gamma_{III}=2F_t/t$.

Figure 17:
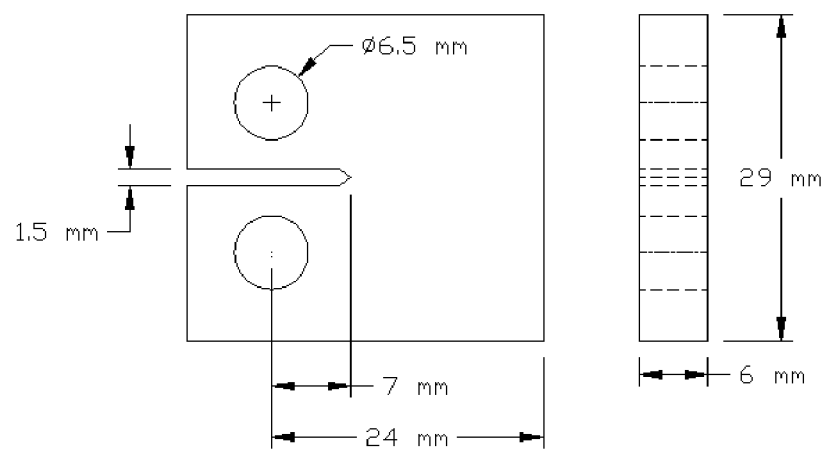
FIG. 17 shows compact-tension specimen geometry.
Figure 18:
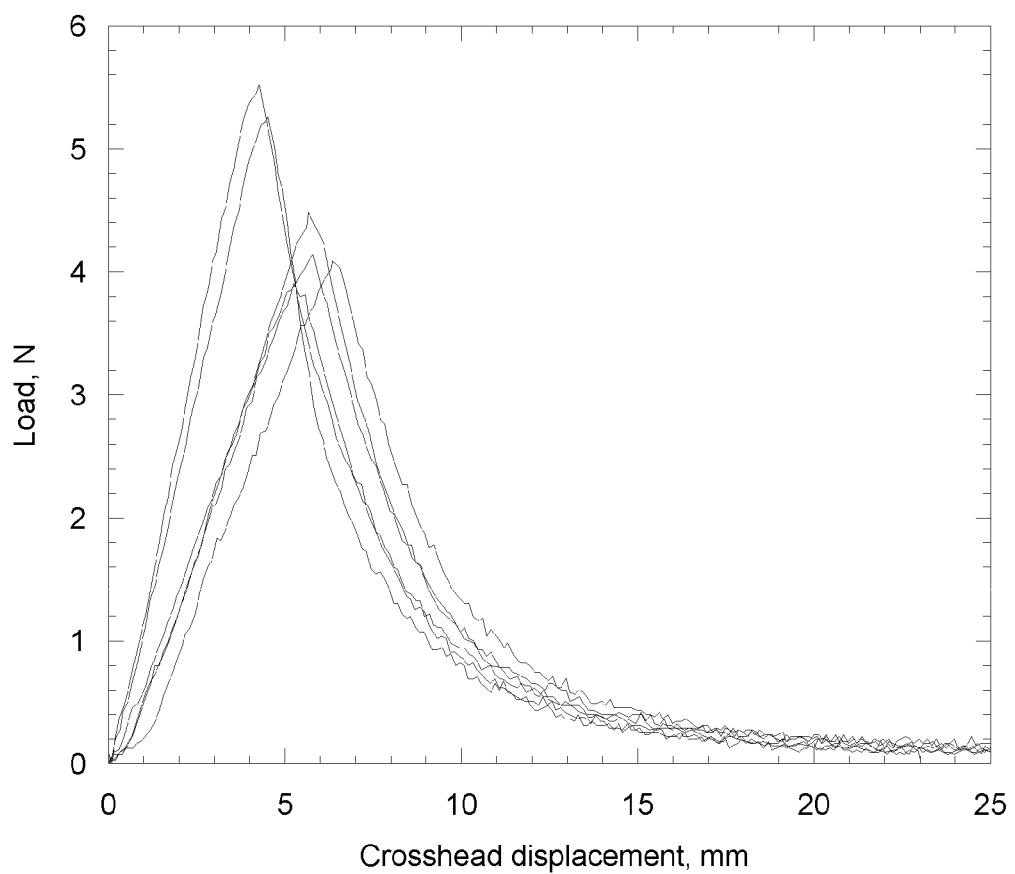
FIG. 18 shows loading curves of the compact tension tests.

Compact tension specimens were prepared according to ASTM Standard D5045-99 (FIG. 17). The specimens were loaded at the pin points and a CCD camera was used to monitor the crack growth during the tests. Examples of the resulting load versus displacement curves are shown in FIG. 18. The fracture toughness, $K_{Ic}$, was calculated from the failure load as defined in the standard. The mode-I toughness was then determined to be $\Gamma_I$=238±50 J/m² from the relationship $\Gamma_I=(1-v^2)K_{Ic}^2/E$, with E=3.5±0.2 MPa and v=0.5 (as appropriate for an elastomer).

3 Properties of the Surface-Modified Layer 3.1 Thickness of the Surface-Modified Layer Imaging a cross-sectioned piece of oxidized PDMS is the most straightforward method for attempting to measure the thickness of the surface-modified layer. However, it was found that sectioning the PDMS by means of a scalpel blade or by fracture created a fracture lip at the free surface. This feature was at a similar scale (~0.5 µm) to the expected thickness of the surface-modified layer and dominated any observations made in the scanning electron microscope (SEM) or atomic-force microscope (AFM). It was found that this could be eliminated by bonding two slabs of oxidized PDMS, and then fracturing the bonded specimen to expose a cross-section containing the interface. An oxidized surface of PDMS readily forms a permanent bond upon contact with another oxidized surface of PDMS; a fact that is exploited in the manufacture of micro-fluidic devices. However, for the bond to form, at least one of the oxidized surfaces should retain sufficient compliance to achieve good conformal contacts. In particular, the surface of PDMS that had been oxidized for four minutes, did not have sufficient compliance. However, oxidation for only one minute provided the required change in surface chemistry, while retaining sufficient compliance. Therefore, PDMS that had been oxidized for four minutes was bonded to PDMS slabs that had been oxidized for one minute. A crack was then introduced into one of the back surfaces (perpendicular to the bonded interface), and the specimen was cleaved. The resultant fracture surface was relatively flat, with no delamination or fracture features at the interface.

Imaging a fractured section in an environmental scanning electron microscope produced no contrast between the surface-modified layer and the bulk PDMS. Nor were any features visible by optical microscopy. However, a clear interface was observed using the phase-imaging function of the AFM (MultiMode Scanning Probe Microscope, Veeco Instruments, Inc.) in tapping mode. The phase image is a three-dimensional representation of the phase lag between the tapping-mode cantilever's oscillations and the input signal. The phase lag has been shown to depend on the elastic modulus as well as other properties (e.g., visco-elasticity and adhesion) of the material being profiled (Magonov et al. Surface Science 375: L385-L391, 1997; Bar et al., *Polymer* 42: 3627-3632 2001; Clement et al. Polymer 42: 6259-6270 2001). Therefore, the fact that a contrast in the phase image at the bonded interface could be seen was taken to be an indication that there was a local change in the material properties at the oxidized surface. The distance over which this contrast could be detected was taken to be a measure of the thickness of the surface modified layer.

Figure 19A:
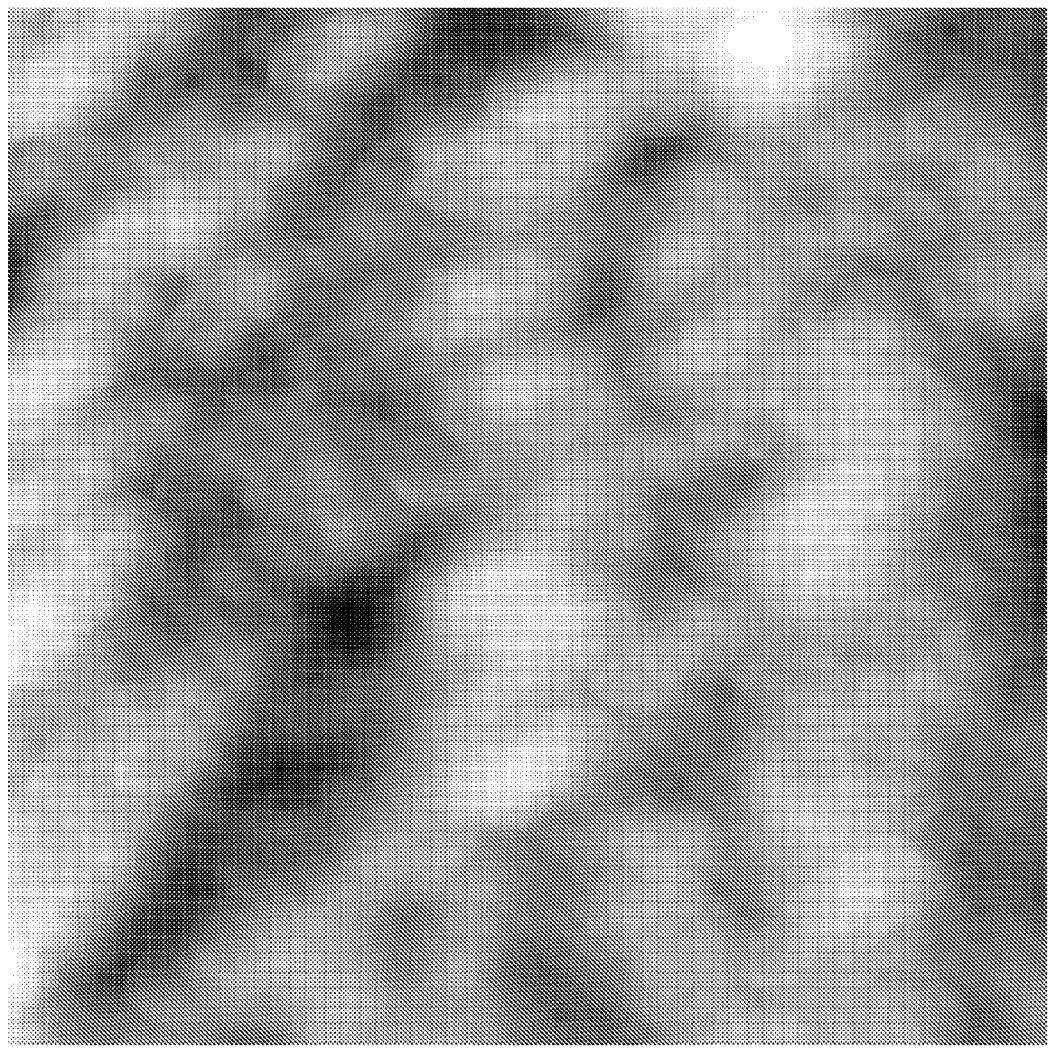
FIG. 19 shows AFM images of nanochannels of embodiments of the present invention. a. AFM height images of the cross-section containing the bond between the surface of PDMS oxidized for one minute (on the left) and the surface oxidized for four minutes (on the right). b. AFM phase images of the cross-section containing the bond between the surface of PDMS oxidized for one minute (on the left) and the surface oxidized for four minutes (on the right). c. A plot of the phase angle across the bond at a location on the phase image in FIG. 19b.
Figure 19B:
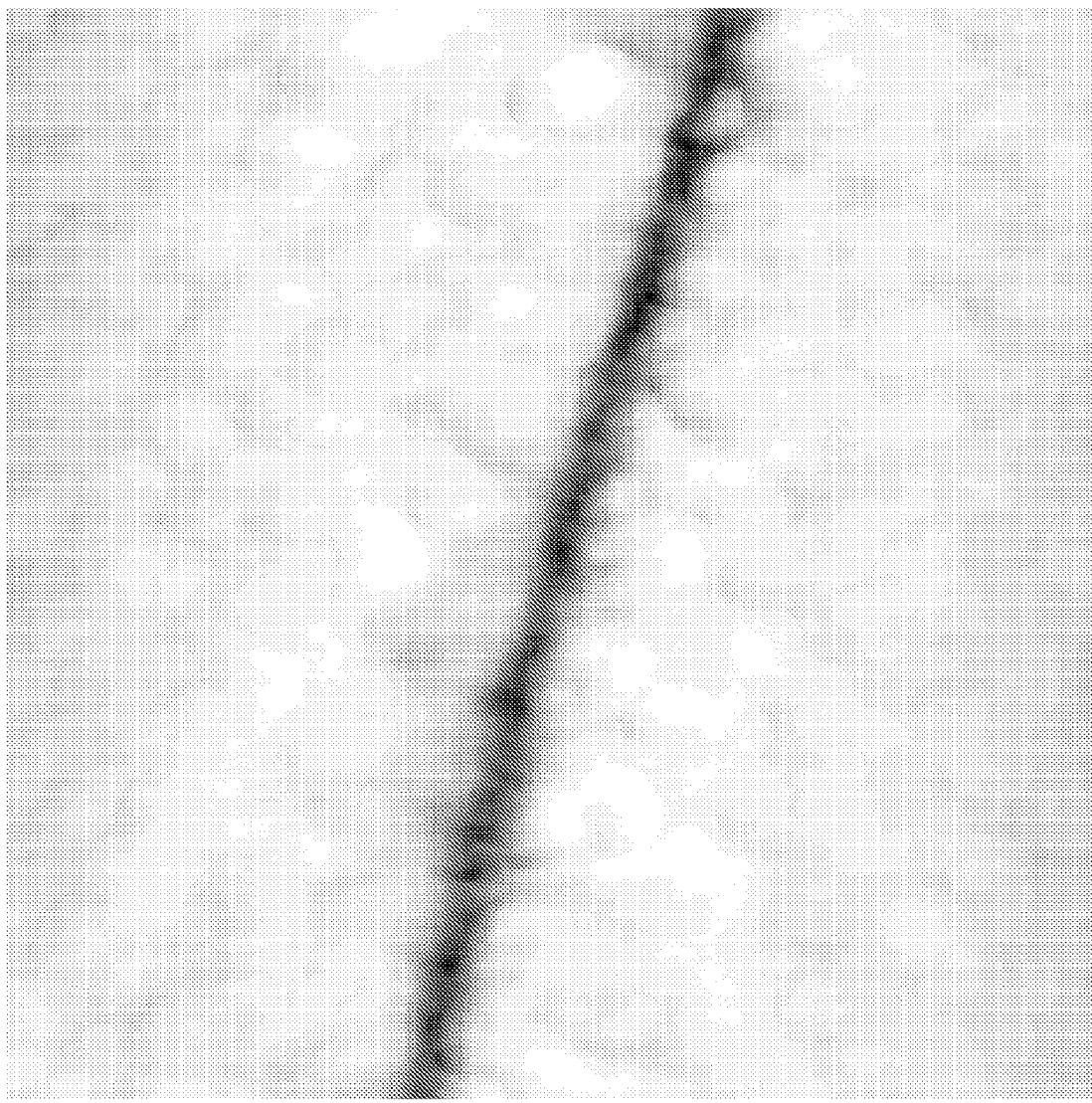
Figure 19C:
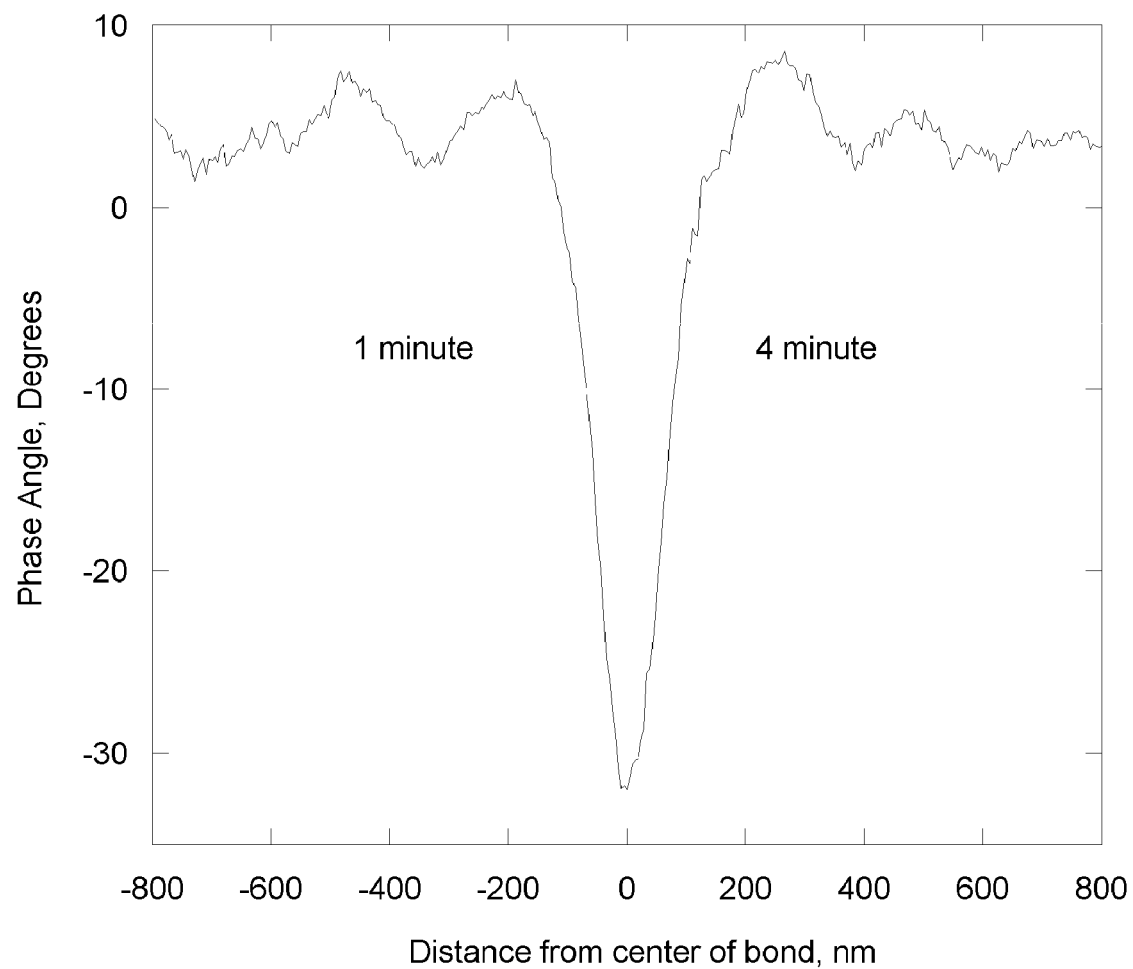

A typical height image of the cross-section near the interface region is shown in FIG. 19*a*. No obvious indication of the interface can be seen in this image. The phase image of the same region is shown in FIG. 19*b*. In this image a clear demarcation can be seen between the PDMS oxidized for 1 minute (on the left) and the PDMS oxidized for 4 minutes (on the right). The phase images were not sensitive to any of the minor topographical features captured in the height images. A line trace on the phase image across the interface is shown in FIG. 19*c*. This trace indicates that any compositional changes within the surface-modified layer were not uniform. The lowest point of the line trace was taken to be the bond line between the two oxidized samples, and the distance to where the phase angle returned to the average bulk value was taken to be the surface-modified layer thickness. Therefore, the changes are a maximum at the surface and decay to the bulk values over a few hundred nanometers.

The absence of any discontinuity in the phase angle at the interface region in FIG. 19*c* indicates that the two surfaces (for the PDMS oxidized for one minute and for the PDMS oxidized for four minutes) may have similar compositions. The only difference between the two oxidation treatments is the thickness of the surface-modified layer. The surface-modified layer for the specimen oxidized for only one minute appeared to be significantly thinner than the layer resulting from oxidation for four times as long. Measurements were taken from two sets of bonded specimens, and multiple traces were taken from each of these specimens. These measurements indicated that the thickness of the surface-modified layer of the specimens oxidized for four minutes was 200±40 nm, with the full range of uncertainty being exhibited in a single specimen. As can be seen from FIG. 19*b*, the transition from the surface-modified layer to the bulk material was not smooth. The measurements also indicated that the thickness of the surface-modified layer in a specimen oxidized for one minute was approximately half as thick as a layer resulting from four minutes of oxidation. Associated experiments in which both halves were oxidized for only one minute confirmed that one minute of oxidation indeed resulted in a surface-modified layer thickness of 110-125 nm. This result is indicative of a diffusion-dominated oxidation process where the depth is predicted to be proportional to the square-root of the time of exposure. The relationship between the phase angle and the distance from the presumed interface shown in FIG. 19*c* is not inconsistent with an error function. However, for the purposes of the subsequent analyses, an approximation was made that the properties of the surface-modified layer followed a linear profile.

2.4 Elastic Modulus of the Surface-Modified Layer

Figure 20:
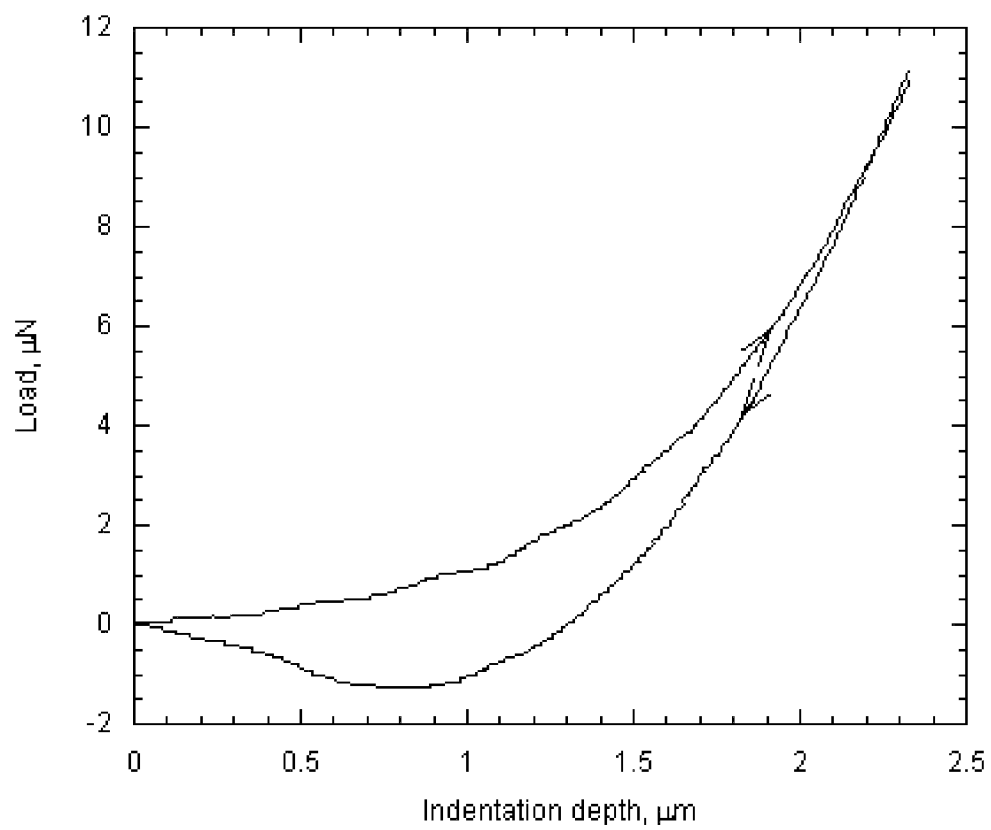
FIG. 20 shows load versus indentation depth curve for the stiff cantilever (k=40 N/m) indenting on the surface-modified layer of PDMS.

Nanoindentation was performed using the "force mode" of the AFM. Before each set of indents was performed, the cantilever deflection was calibrated by bringing the probe into contact with silicon, which provided a hard reference surface. The first set of experiments involved the use of a relatively stiff AFM probe (with a cantilever stiffness of k=40 N/m, as determined by the manufacturer (Veeco Probes, Inc.) to indent oxidized PDMS. FIG. 20 shows that the resultant plot of load against indentation depth is reminiscent of a characteristic plastic indent (Oliver and Pharr, *Journal of Materials Research* 7(6): 1564-1583 1992). The indentation depth reached between 2 and 3 µm, and subsequent imaging in the AFM revealed a puncture in the surface-modified layer measuring about 1 µm in width and 50 nm in depth. However, rather than trying to extract any information about the surface-modified layer from this type of behavior, the effect of using a more compliant cantilever was explored.

Figure 21:
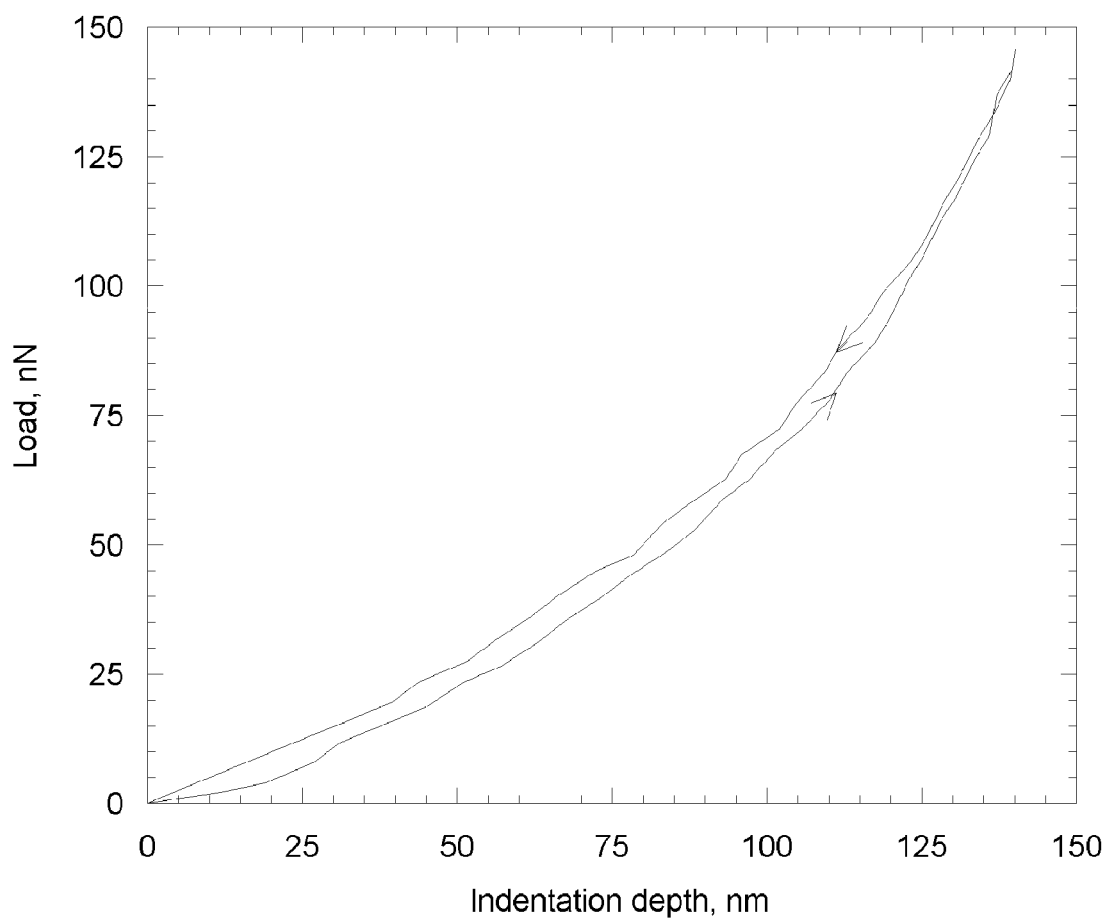
FIG. 21 shows that the load versus indentation relationship for the compliant cantilever indenting on unoxidized PDMS showed typical contact mechanics behavior with no apparent hysteresis between the extend and retract.
Figure 22:
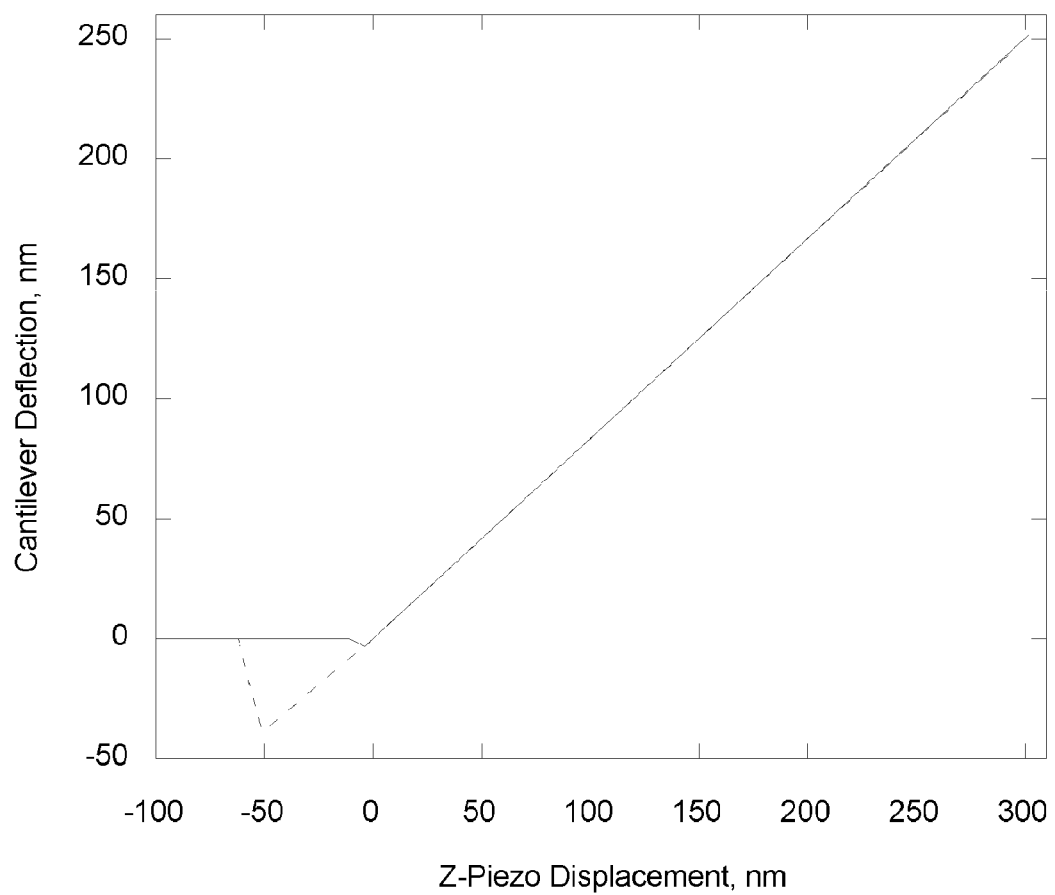
FIG. 22 shows that the load versus indentation depth relationship for the compliant cantilever (k=0.58 N/m) indenting on oxidized PDMS is linear.

Qualitatively different indentation curves were obtained when a relatively compliant cantilever (k=0.58 N/m) was used to indent unoxidized and oxidized PDMS surfaces. Indentation on an unoxidized PDMS surface showed the classical non-linear behavior with essentially no hysteresis associated with the contact mechanics for the indentation of an elastic body (FIG. 21). No permanent indentation was found during subsequent imaging by AFM. In contrast, indentation on an oxidized PDMS surface resulted in a linear relationship between the cantilever deflection and the translation of the sample, with some effects of adhesive contact as the AFM probe came into contact and left the surface (FIG. 22). Multiple indentations were performed on a single sample of PDMS that had been oxidized for four minutes, with recalibration repeated during the experiment. All the indentations were very consistent, and resulted in a characteristic plot of load against indentation depth shown in FIG. 23.

This linear relationship between load and indentation depth for the oxidized PDMS indicates that the contact area between the probe tip and the material did not increase with indentation depth, as would be expected from classical indentation models. Instead, the behavior is consistent with point loading of an elastic beam on an elastic foundation. It is this model that can be used to extract the properties of the surface-modified layer. The deflection, $\Delta z_i$, of an elastic plate bonded to an elastic half-space and subjected to a point load P, is given by $$\Delta z_i = \frac{P}{3\sqrt{3}} \left( \frac{(1+v_s)^2(3-4v_s)}{4E_s^2(1-v_s)^2 D} \right)^{1/3}, \quad (1)$$

where D is the bending stiffness of the plate, $E_s$ is the modulus of the substrate and $v_s$ is the Poisson's ratio of the substrate. $E_s$ for this material is 3.5±0.2 MPa, and $v_s$ can be taken to be equal to 0.5. Therefore, the relationship between the indentation depth and applied load is given by $$\frac{P}{\Delta z_i} = 9.1(\pm 0.3) \times 10^4 D^{1/3} \text{ N/m}. \quad (2)$$

Figure 23:
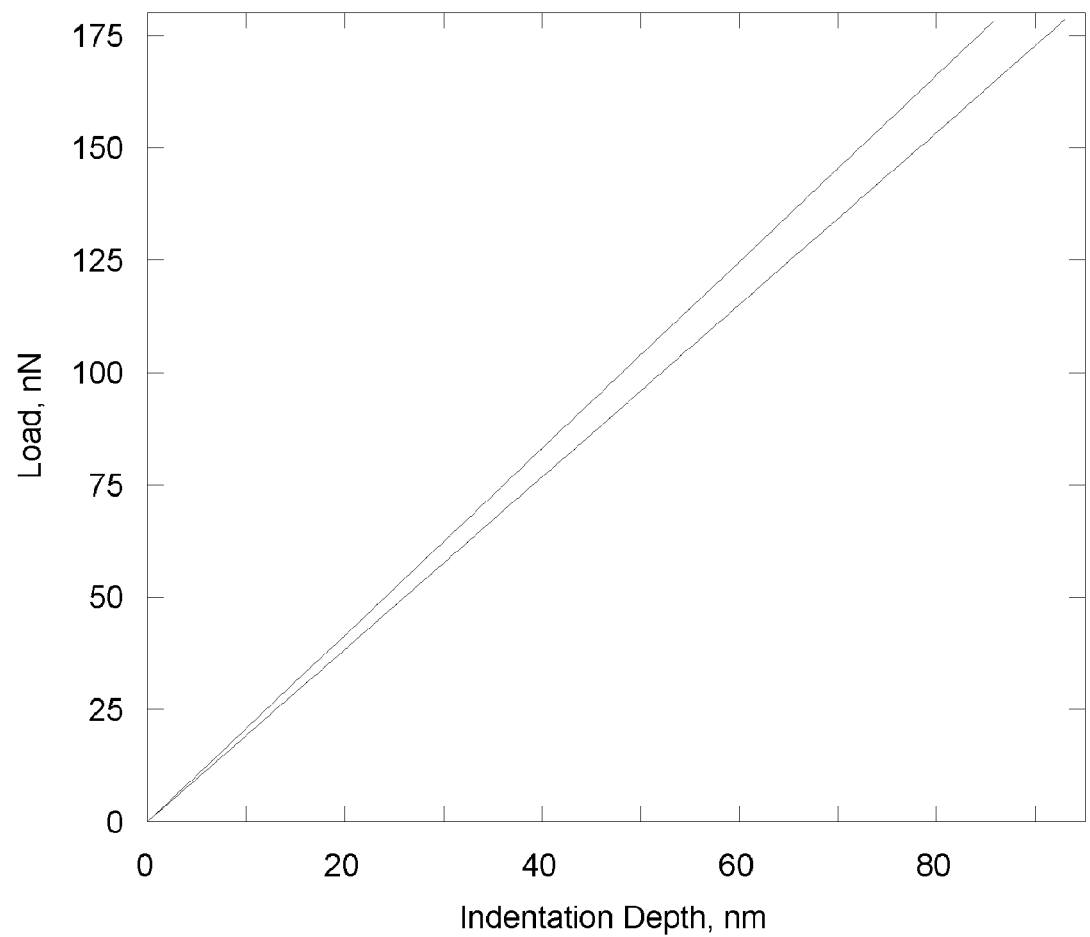
FIG. 23 shows the range of load versus indentation depth curves for all indents taken in various positions on the surface-modified layer of one PDMS sample that had been oxidized for four minutes.

From FIG. 23, it can be seen that the experimental relationship between the load and indentation depth is in the range of 1.9 to 2.1 N/m. Therefore, a comparison with Eqn. 2 indicates that the bending stiffness of the surface layer is equal to $(1.1\pm0.2)\times10^{-14}$ nm.

To estimate the modulus from a bending stiffness requires knowledge of the thickness and whether the modulus varies through the thickness of the surface-modified layer. As discussed in section 3.1, it is assumed for the purposes of analysis that the modulus decreases linearly from a value designated as $E_f$ at the surface to $E_s$ at the depth previously identified as the thickness of the surface-modified layer, h. With this linear assumption, the bending stiffness of the surface layer can be calculated as $$D = \frac{(\overline{E}_f^2 + 4\overline{E}_f\overline{E}_s + \overline{E}_s^2)h^3}{36(\overline{E}_f + \overline{E}_s)}. \quad (3)$$

Here, $\overline{E}_f$ and $\overline{E}_s$ refer to the plane-strain moduli of the surface-modified layer and PDMS, respectively. Substituting into this equation the values h=200±40 nm, $E_s$=3.5±0.2 MPa, $v_s$=0.5, and D=(1.0±0.2)×10$^{-14}$ N·m, results in a value for the surface modulus of $\overline{E}_f$=37±10 MPa. This maximum value of the modulus at the surface of the oxidized layer is between 7 and 13 times larger than the modulus of the substrate. If it were to be assumed that the properties of the surface-modified layer were not graded, but still had a thickness of about 200 nm, then the effective modulus of the layer would be 12±3 MPa from the relationship $D=Eh^3/12(1-v^2)$.

In the experiments described in the following section, buckling of the surface layer was observed. The details of this observation can be used as a point of comparison for the results presented above. For a uniform plate of thickness h, the buckling wavelength of a surface layer is expected to be of the form (Huang et al. *Journal of the Mechanics and Physics of Solids* 53(9): 2101-2118 2005).

$$\lambda = 9.97(D(1-v^2)/E_s)^{1/3} \quad (4)$$

For the parameters determined in the present study this equation indicates that the buckling wavelength would be about 1.3 μm. While the effect of a graded layer on the buckling wavelength is not yet known, this result is very close to the observed wavelength which was found to be 1.34±0.06 μm and provides some confirmation of the magnitude of the properties of the surface-modified layer.

3 Fracture of the Surface-Modified Layer 4.1 Experimental Observations

Once the properties of the surface-modified layer have been determined, observations of the nano-cracking behavior can be compared to mechanics models. A controlled experiment was performed in order to study the behavior of the nano-cracking with respect to applied tensile strain. Several PDMS specimens were oxidized for four minutes in the same run in order to ensure that the surface-modified layer on each was as close to the same as possible. After oxidation, some of these specimens were used to determine the resulting thickness and modulus of the surface-modified layer (as reported in the previous sections). The remaining rectangular pieces (40 mm×10 mm×2 mm) were individually mounted in a manual micrometer-screw-driven tensile machine (MicroVice Holder (S.T. Japan USA, LLC. FL, USA)) and strained in tension. These specimens were organized into five sets of two specimens, and each set was tested to different levels of nominal strain: 6, 10, 15, 20, and 30%. One specimen from each set was removed from the testing machine and relaxed before being examined. The other specimen from each set was left in place under an applied strain while a PDMS replica was created of its surface. To ensure complete removal of the replica the cracked surface was first exposed to a silane treatment (For seven minutes in a vacuum chamber a 1:1 mixture of (tridecafluoro-1,1,2,2-tetrahydrooctyl)-1-trichlorosilane and mineral oil was evaporated onto the cracked surface to form a monolayer of silane molecules) to increase the hydrophobicity of the surface-modified PDMS. Square sections of approximately 10 mm by 10 mm were then cut from the center region (away from the ends gripped by the stretcher) of both the relaxed specimens and the replicas of the strained surfaces. The surfaces of both sets of specimens were imaged using an atomic-force microscope in tapping mode.

Figure 24:
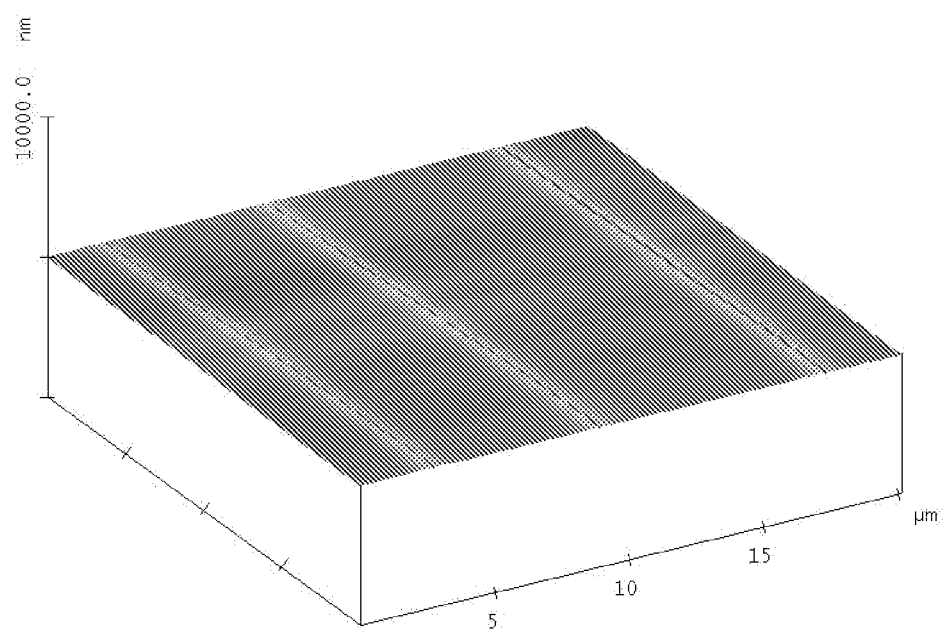
FIG. 24 shows an AFM image of a cracked and relaxed surface.
Figure 25:
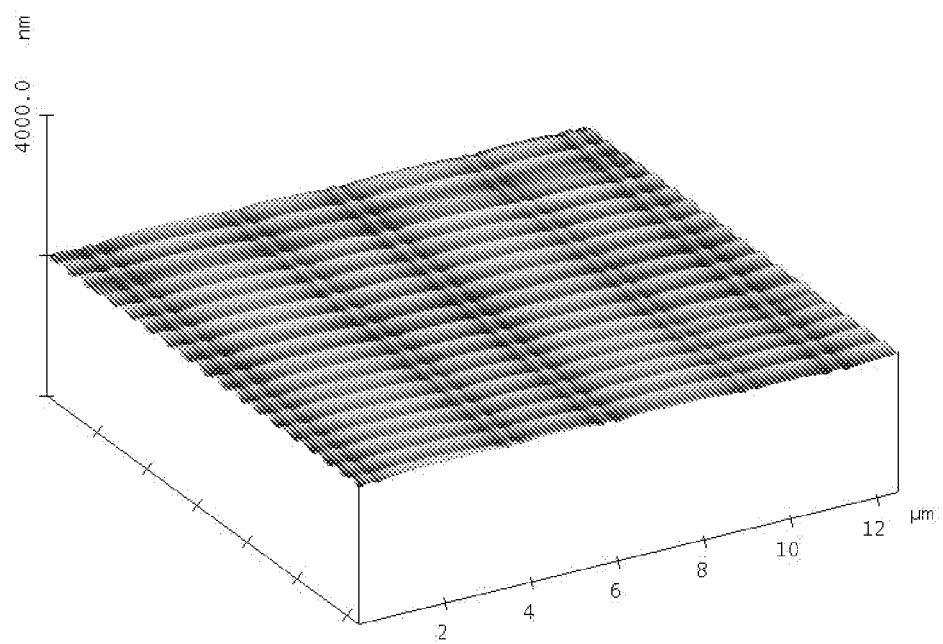
FIG. 25 shows an AFM image of mold of strained surface of oxidized PDMS.
Figure 26:
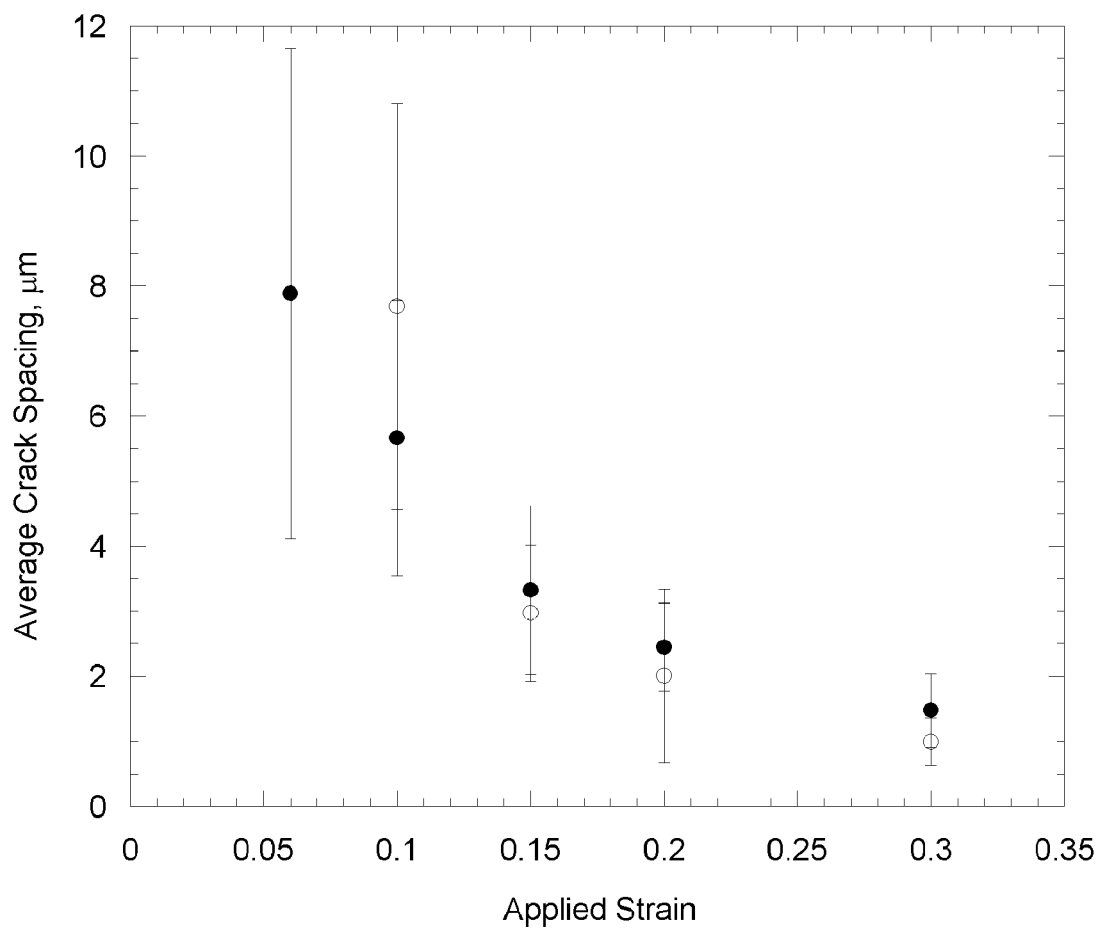
FIG. 26 shows average crack spacing versus applied strain, both strained molds (●) and relaxed cracks (○).

The applied tensile strain resulted in a series of parallel nanocracks in the surface-modified layer oriented perpendicular to the direction of stretching. The average crack spacing was measured from a series of AFM images and is plotted as a function of the applied strain for all the specimens in FIG. 26. Consistent with prior analyses and observations of thin-film cracking (Thouless *Journal of the American Ceramic Society* 73(7): 2144-2146 1990; Thouless et al. *Acta Metallurgica et Materialia* 40(6): 1287-1292 1992; Shenoy et al. *International Journal of Fracture* 103(1): 1-17 2000), the average crack spacing decreased with increasing applied strain. In addition to the nano-cracks, for tensile strains of 15% and above, surface buckles were induced perpendicular to the cracks with a wavelength of 1.34±0.06 μm. An image taken with the AFM of a surface that has been cracked by an applied strain and then allowed to relax is shown in FIG. 24; while an image taken from a replica of a strained surface with the accompanying surface buckling is shown in FIG. 25.

The buckles created by the application of the tensile strain seem to be created by a different mechanism that those created by an imposed compressive strain (Bowden et al. *Appl. Phys. Lett.* 75, 2557-2559 1999). The surface buckles are always observed to occur at strains greater than those that introduce the nano-cracks. The present invention is not limited to a particular mechanism. Indeed, an understanding of the mechanism is not necessary to practice the present invention. Nonetheless, it is contemplated that they are associated with the development of the nano-cracks and it is postulated that they form by the following mechanism. The cracks cause stress relaxation in the material between them. The material below the cracks supports a tensile strain in the axial direction. Poisson's ratio effects induce a lateral contraction, which imposes a lateral compressive stress on the material between the cracks. This compressive stress, in conjunction with the modulus mismatch between the surface layer and the bulk, results in surface buckles.

Figure 27:
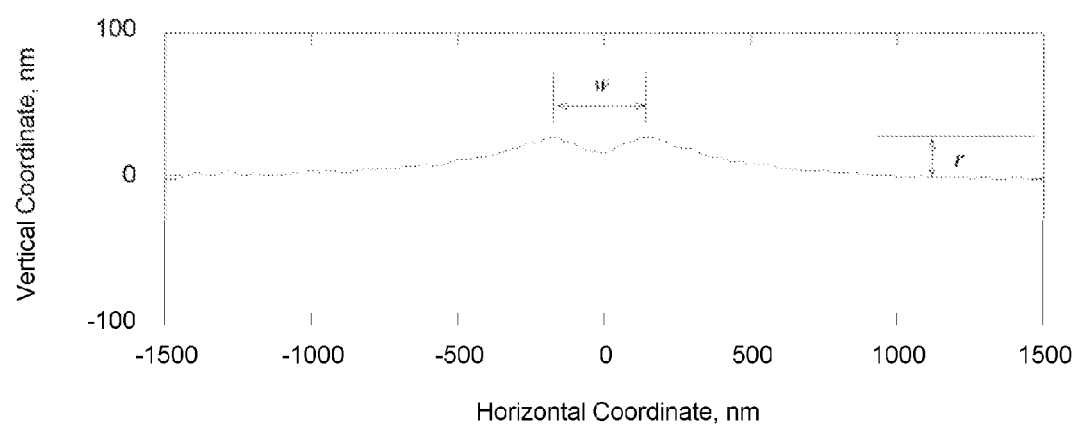
FIG. 27 shows a typical profile of a nano-crack obtained with the AFM. The width, w, and rise, r, of the cracks were measured as indicated.

The profiles of individual nano-cracks (or replicas of nano-cracks) were examined in detail by AFM; an example of a typical profile is shown in FIG. 27. It may be noted that the shape of the crack shown in FIG. 27 has some resemblance to cracks formed by surface diffusion (Mullins *Journal of Applied Physics* 28(3): 333-339 1957; Thouless et al., *Acta Metallurgica et Materialia* 41(4): 1057-1064 1993), where the rise near the crack mouth is associated with effects of surface diffusion. However, the role of diffusion in the formation of the cracks was eliminated by a series of studies where the relaxed crack profile was continually monitored by AFM for a period of eight hours after being created. Insignificantly small changes were observed in the crack geometry, leading to the conclusion that all effects are dominated by elasticity. Therefore, the rise is associated with the effects of Poisson's ratio at the crack surface. Since the crack surface relaxes in-plane strains, the out-of-plane contractions relax, causing the surface near the cracks to rise. Additionally, the relatively smooth curves at the crack mouth were not expected for an elastic crack—this feature may be associated partly with the geometry of the AFM tip. It may also be associated with the effects of surface tension deforming a relatively compliant material (Hui et al. *Langmuir* 18(4): 1394-1407 2002).

Figure 28A:
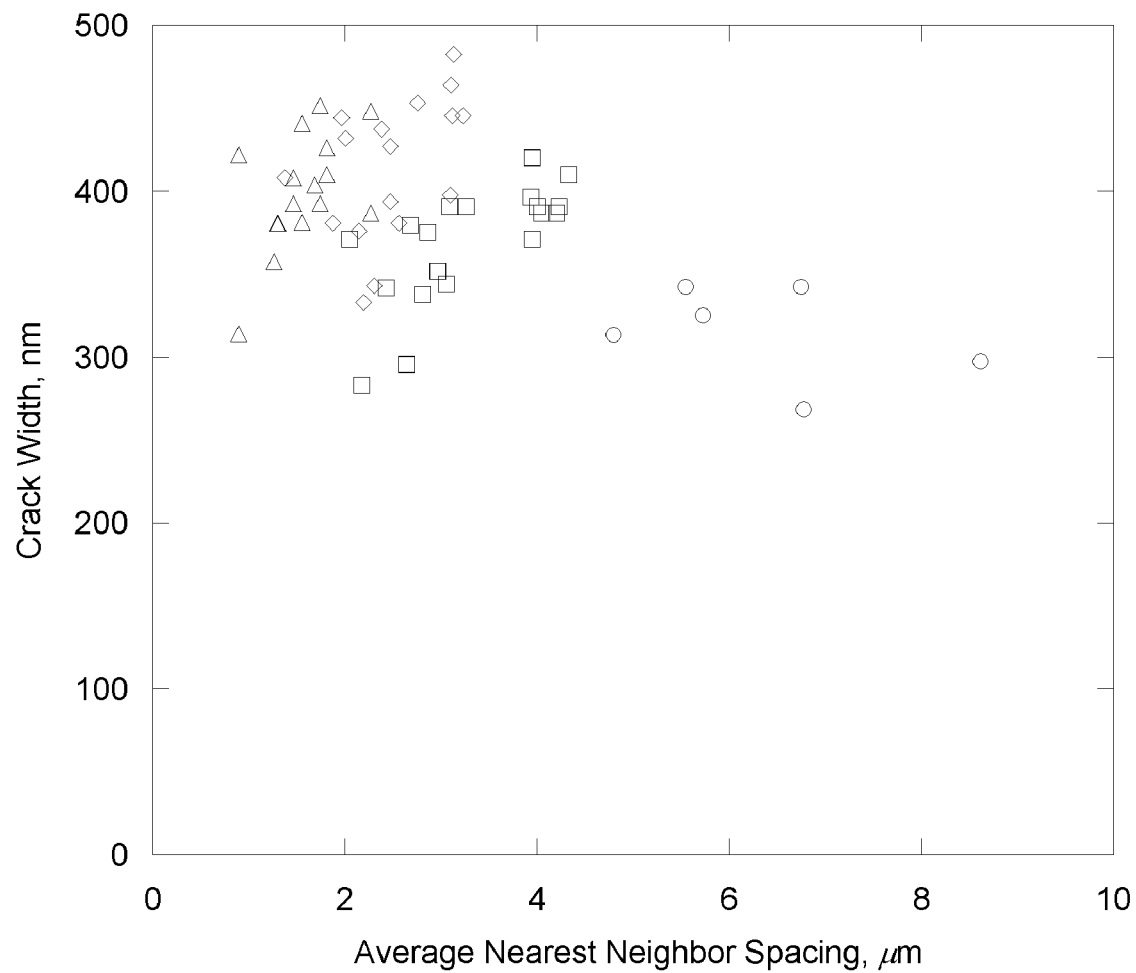
FIG. 28 shows crack widths of nanochannels of embodiments of the present invention. a. Experimentally measured crack widths, w, are plotted against the average nearest neighbor crack spacing, L, for 10% (○), 15% (□), 20% (◇), and 30% (▲) applied strain. b. Experimentally measured crack rises, r, are plotted against the average nearest neighbor crack spacing, L, for 6% (⌐), 10% (○), 15% (□), 20% (◇), and 30% (▲) applied strain.
Figure 28B:
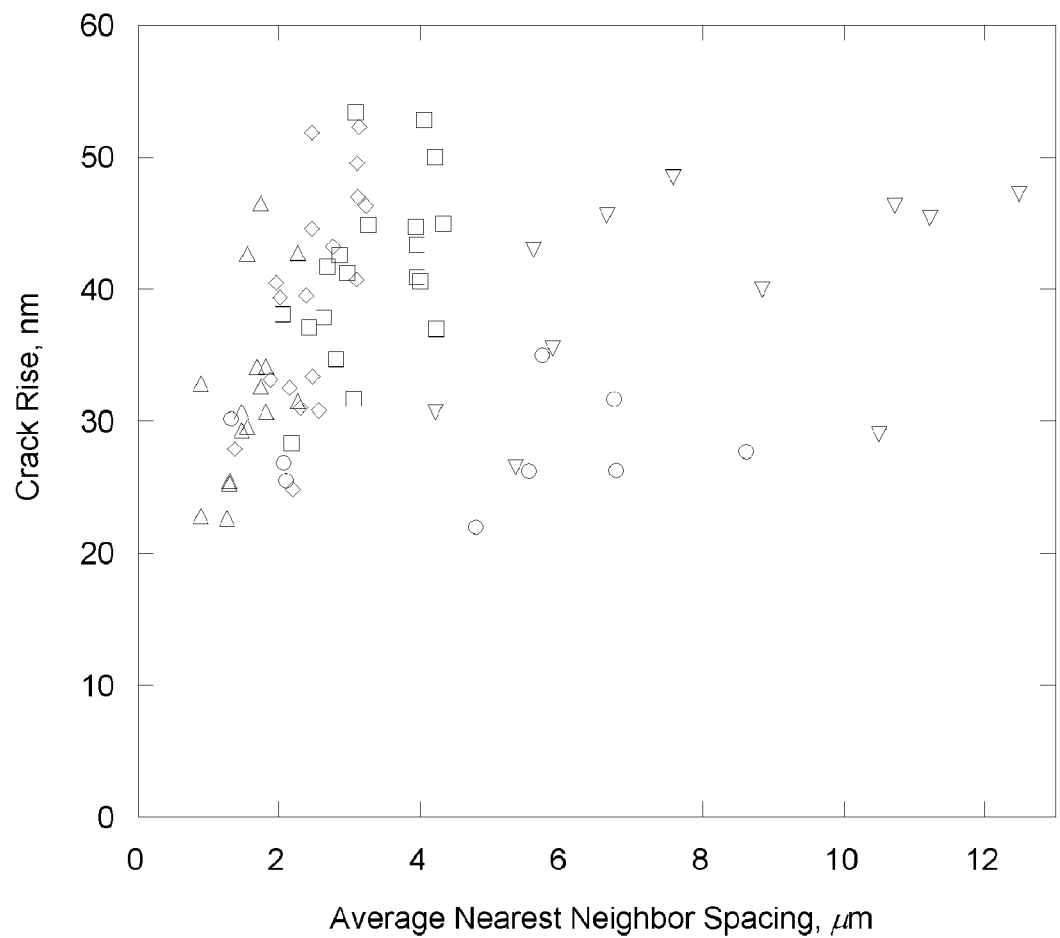

The cracks were characterized by three parameters: the crack spacing (the average distance to the nearest two neighbors), L; the crack opening, w; and the maximum height that the edges of the crack rose above the surface of the PDMS, r. The crack rise and opening are exterior features of the crack, and can be determined by AFM imaging of either the relaxed specimens or the replicas. The widths of the cracks are plotted as a function of the average distance to their nearest-neighbor cracks in FIG. 28a. The corresponding rises of the cracks are plotted as a function of the average distance to the nearest-neighbor cracks in FIG. 28b.

Figure 29:
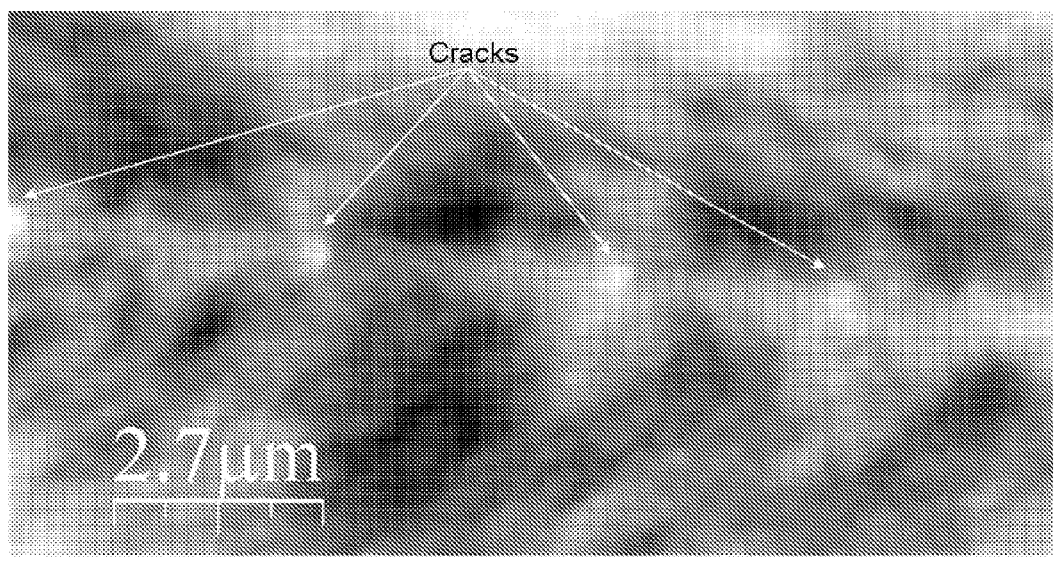
FIG. 29 shows AFM height image of mold of strained cross-section containing the bonded interface of two slabs of PDMS.

The crack depth, d, could not be determined directly since the AFM probe could not penetrate to the tip of the crack, nor was there any guarantee that the PDMS used to make replicas of the cracked surface could flow all the way to the crack tip. Other experimental procedures were attempted in order to obtain a direct measurement of the crack depth. Sectioning (by fracture) a cracked slab of PDMS resulted in damage to the free edge of the specimen, so that attempts to image the cracked edge or a replica of the cracked edge with the AFM were unsuccessful. Bonding a cracked specimen to another oxidized piece of PDMS (in a manner similar to that discussed in section 3.1) failed because the surface topography introduced by the cracks prevented intimate contact between the two surfaces. Finally, two slabs of oxidized PDMS were bonded together, sectioned, and then strained after bonding. This resulted in the appearance of cracks on a replica of the strained cross-section containing the bond. Periodic mounds could be seen at the interface at approximately the same interval as the expected crack spacing (FIG. 29). This provides another method of generating nanochannels of having a brittle thin film sandwiched from both sides by a polymer that is elastic, then straining this combined structure, to selectively create cracks in the thin film. These nanochannels are also tunable in that larger strain opens the channels more and relaxing narrows or closes the channels.

4.2 Discussion 4.2.1 Effects of Possible Residual Strain

Figure 30:
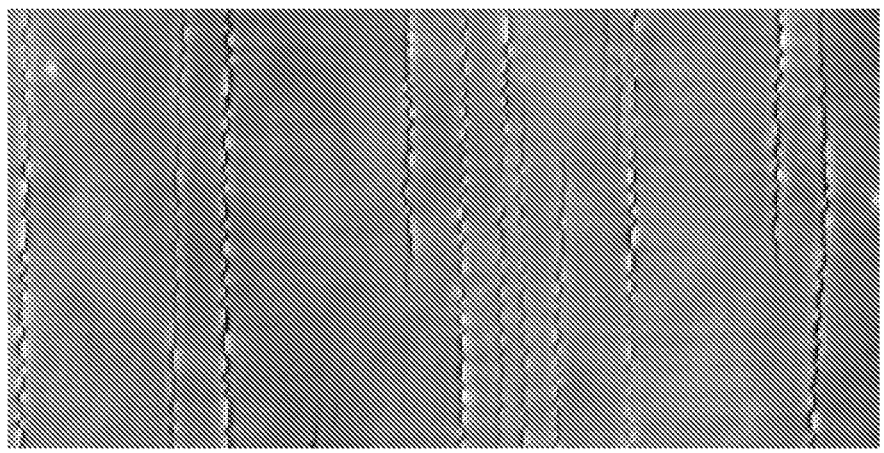
FIG. 30 shows relaxed cracks that have healed.
Figure 32:
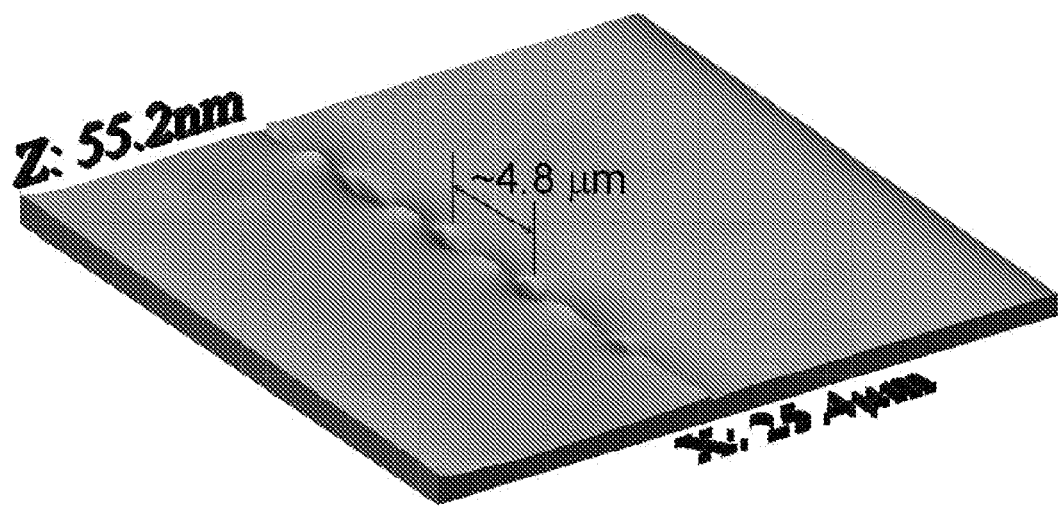
FIG. 32 shows another view of relaxed cracks that have healed.
Figure 33:
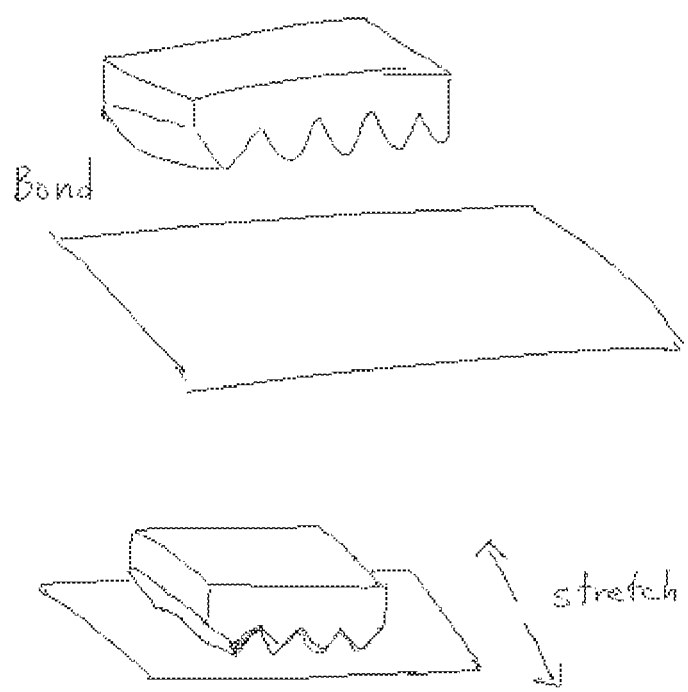
FIG. 33 shows cracks that form at points where top grating touches flat sheet will produce array of short nano channels one next to the other in sequence separated by larger voids.
Figure 34:
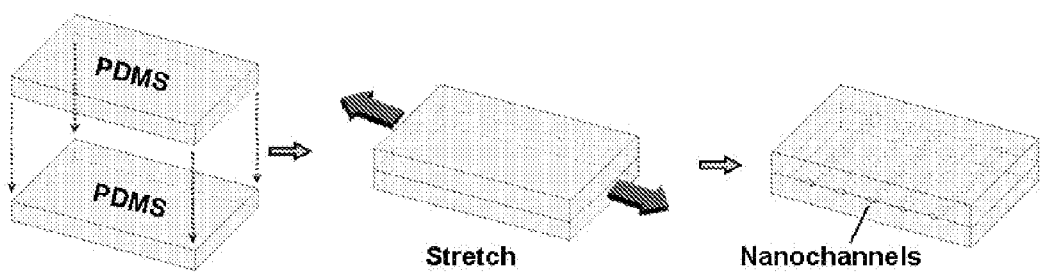
FIG. 34 shows a schematic figure of how to form an elastomeric polymer sandwiched brittle thin film by oxidizing two PDMS pieces, bonding the two pieces together, then stretching to create cracks in the brittle thin film which make up channels.
Figure 35:
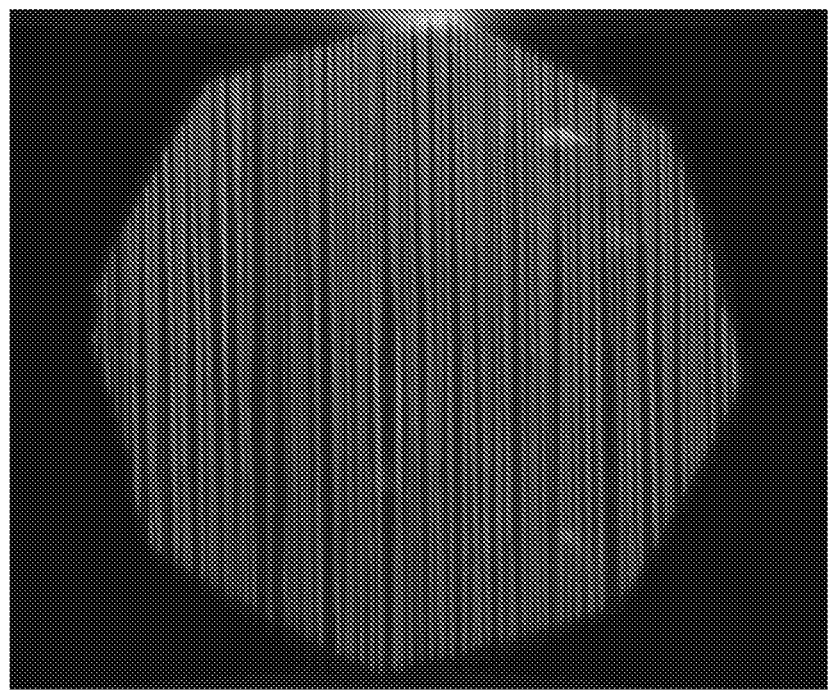
FIG. 35 shows a fluorescent micrograph of an array of nanochannels prepared by the method of FIG. 34 of stretching an elastomer sandwiched brittle thin film, filling the channels with fluorescein solution, then taking the micrograph.

The morphology of the nanocracks in the relaxed specimens took two different forms. In one, the cracks were narrower, shorter versions of the strained cracks, with measurable widths and rises (FIG. 24). In the other, the cracks appeared to have completely, but imperfectly, healed, leaving the appearance of an overlapped edge (FIG. 30, 32). The net density of the open and healed cracks on the relaxed specimens was comparable to the density of the cracks measured from the replicas taken from the corresponding strained specimens. This indicates that the origin of both types of cracks is the same—they are formed during tensile loading. The existence of open cracks after the load is removed indicates, in the absence of any obvious hysteresis effects, that there must be a residual tensile stress introduced by the oxidation process in the surface-modified layer. The present invention is not limited to a particular mechanism. Indeed, an understanding of the mechanism is not necessary to practice the present invention. Nonetheless, it is contemplated that the morphology of the healed relaxed cracks (FIG. 30, 32) indicates the following further understanding of the mechanics. While the small residual tensile stress associated with the oxidation process is often sufficient to hold open many of the cracks generated, the cracks are at a scale where they are on the border between remaining open because of the residual tension and spontaneously collapsing under the effect of surface forces. If a crack does collapse, the tension perpendicular to the crack surfaces that is associated with the surface forces induces a lateral compressive strain parallel to the crack. This local compression, in conjunction with the modulus mismatch between the surface modified layer and the substrate leads to the buckling pattern observed in FIGS. 30 and 32. This understanding is supported by the observation that the period of the buckles in FIGS. 30 and 32 is similar to that of the surface waves observed upon applying a tensile load to the cracked specimens.

In conclusion, the observations on the relaxed specimens indicate that the oxidation process induces a small tensile strain. This residual strain is relatively small after a four-minute oxidation, because it is insufficient to prevent many of the cracks from collapsing. Therefore, the effects of any residual stress induced by the four minutes of oxidation are neglected in the analyses that follow. However, it was noted that specimens oxidized for a significantly longer period of time tended to form spontaneous cracks without the need to apply a tensile load. This is consistent with the notion that the increased oxidation time results in a thicker surface-modified layer or/and increased tensile strain.

4.2.2 Crack Depth

In the absence of any residual strain, both the width, w, and the rise, r, of the cracks are dependent on the properties of the system, $\overline{E}_s$, $\overline{E}_f$, and $h$, and on the crack spacing, L, depth, d, and applied strain, $E_{app}$. Since the specimens used to produce the plots of FIG. 18 were all oxidized at the same time, $E_f$ and h are expected to be reasonably constant for all the data points shown. Therefore, the large variability seen for the data taken from the strained cracks at equal values of $E_{app}$ and L indicates a substantial variability in crack depth. The present invention is not limited to a particular mechanism. Indeed, an understanding of the mechanism is not necessary to practice the present invention. Nonetheless, it is likely that the variability in crack depth is due to the fact that the interface between the surface-modified layer and the bulk material was not smooth (FIG. 19b).

Figure 31:
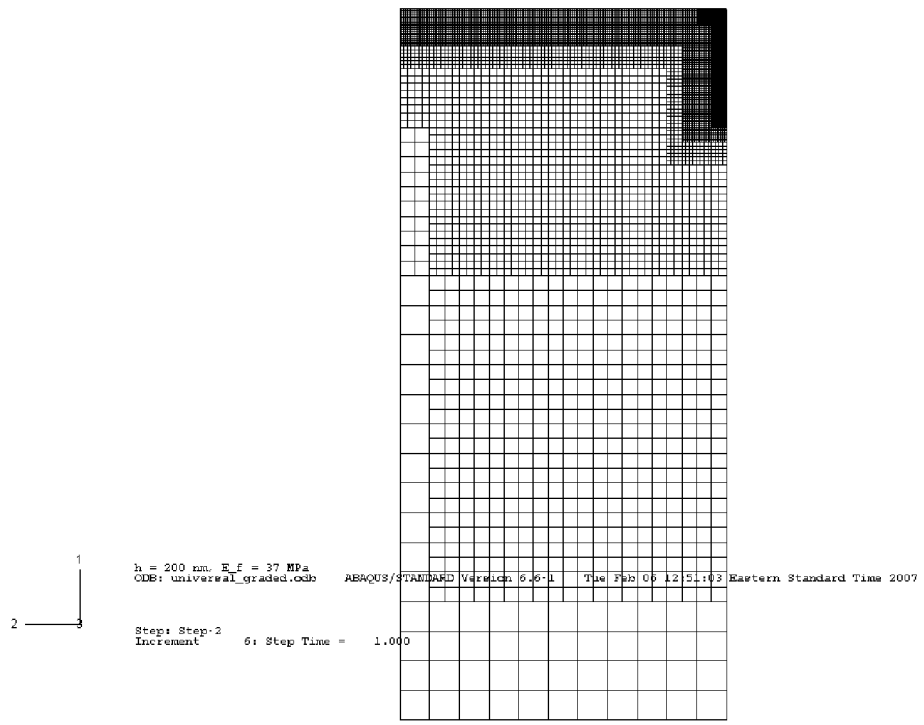
FIG. 31 shows finite-element mesh used for fitting the width and depth of the cracks.

Estimates of the crack depths were made using finite-element calculations of particular cracked geometries and the measured properties of the PDMS and surface-modified layer. A typical model and mesh is shown in FIG. 31. Periodic boundary conditions were used, with the lateral extent of the model being set to L/2 for the particular crack being modeled. The bulk PDMS was modeled with 2D plane-strain hybrid elements and its material behavior was modeled as hyperelastic. The experimentally determined stress/strain curve (FIG. 15) was used to define the constitutive properties. The graded surface-modified layer was modeled with 2D plane-strain linear-elastic elements; its modulus was varied from 37 MPa on the surface to 3.5 MPa at a distance of 200 nm from the surface. A displacement boundary condition was used to simulate the applied strain. The resulting width and rise of the crack were determined from the numerical output, using the same definitions as in the experiments. A series of numerical calculations were conducted with different crack depths, but keeping the crack spacing and strain corresponding to one particular set of experimental results. By comparing the numerical results for the rise and width to the experimental values, an estimate of the experimental crack depth could be obtained. This process of comparison was repeated for a number of different sets of applied strain and crack spacing.

The limited range of possible fits between the numerical results and the experimental observations indicated that the cracks had to extend beyond the thickness previously deduced for the surface-modified layer. The calculated crack depths were in the range of about 300 to 600 nm irrespective of the level of applied strain, compared to a thickness of about 200 nm for the surface modified layer. The fact that the oxidation process may be affecting the toughness of the PDMS to depths from 150% to 300% greater than the depth to where the modulus is affected has significance for the observations of the crack spacing. If the cracks are extending well below the high-modulus region, then the crack spacing can be modeled by results for an elastically homogeneous system (Thouless, 1990, supra; Thouless et al., 1992, supra). In other words, one would expect the crack spacing to be of the order of a few multiples of the crack depth—not vastly more as would be expected for a cracked stiff layer on a compliant substrate (Shenoy et al., *Journal of Fracture* 103(1): 1-17 2000). The magnitudes of the crack spacing are not inconsistent with this conjecture.

4.2.3 Toughness of the Surface-Modified Layer

The average toughness of the surface-modified layer, over a thickness corresponding to the depth of the cracks, was estimated by computing the energy-release rate of a tunneling crack. As the applied strain was increased during the tensile tests, cracks tunneled at increasing densities. A new crack can propagate between two existing cracks only if the energy-release rate for tunneling exceeds the toughness of the surface-modified layer. The stochastic nature of the distribution of the cracks, and the absence of in-situ monitoring of the formation of the cracks, results in an ambiguity in deducing the appropriate crack spacing at which to carry out analyses. Therefore, two different approaches were explored in this study. In one, the minimum average spacing, $L_{min}$, observed for any single crack at a given level of strain was used as the spacing at which a crack could just be propagated at that strain. In the other, this condition was assumed to be satisfied by the smaller of the two cracks that had the minimum single spacing between them.

The calculations were conducted by calculating the change in the total elastic energy between the cracked and uncracked geometry shown in FIG. 31. Periodic boundary conditions, suitable to each of the two different approaches, were used with applied displacements corresponding to the appropriate applied strain. The calculations were done for a range of crack depths, corresponding to those deduced earlier. The strain energy (per unit width) of the uncracked configuration was calculated, and then the strain energy (per unit width) of the cracked configuration was calculated. The energy-release rate for tunneling was found by dividing the change in energy by the crack depth. Since the energy-release rate was calculated for the extreme conditions under which cracks tunneled, this energy-release rate was directly equated to the toughness. The results of the calculations were insensitive to the particular approach used to choose the minimum crack spacing and produced an estimate of the toughness in the range of 100 to 300 mJ/m². This low toughness—three orders of magnitude drop from the bulk value for the PDMS of about 250±300 J/m²—indicates a significant embrittling of the surface layer by the oxidation. Chaudhury and Whitesides (*Langmuir* 7(5): 1013-1025 1991) estimated the free surface energy, $\gamma_s$, of plasma-oxidized PDMS to be approximately 60 mJ/m². The energy required to make two new surfaces in perfectly brittle fracture is $2\gamma_s$. Since the calculated toughness range is very consistent with $2\gamma_s$, the surface-modified layer thus fractures in a brittle fashion. In contrast, the relatively high toughness of the bulk PDMS indicates that there are significant plastic dissipative mechanisms upon crack growth. When the cracks in the surface-modified layer impinge on the bulk PDMS they are stopped by the large and abrupt increase in toughness.

Example 3

Figure 36:
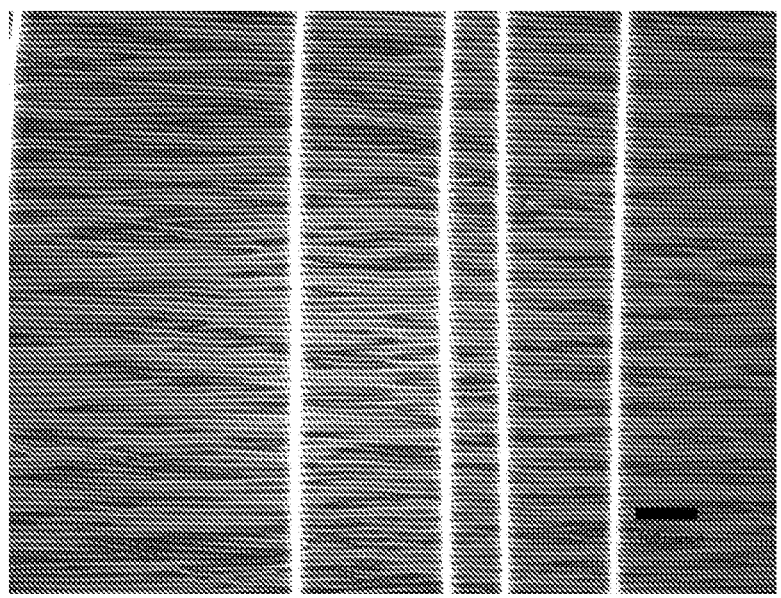
FIG. 36 shows a schematic illustration of an exemplary cracking protocol of embodiments of the present invention.

Dynamic Modulation of Focal Adhesion Complexes in Response to Strain and Compression of Protein-Matrices This example describes the growth of cells on protein coated cracks. FIG. 36 shows a schematic Illustration of cracking protocol layered system with PDMS substrate (thickness=3.5 mm)+Cr intermediate layer (10 nm thickness)+Au layer (40 nm thick) fastened to silanized glass slide with a thin layer of spin-coated PDMS through the sputtering/evaporation process to minimize external stresses. The system is removed from the glass slide by ethanol coating and fastened into stretching device. The entire surface of the system is coated with self-assembled monolayers (SAMs) of alkanethiolates with a terminally substituted oligo (ethylene glycol) group to make the Au surface non-fouling Strain is applied, the thin surface layers crack into the PDMS layer, revealing new PDMS substrate. The entire system is then coated with laminin/fibronectin—however, the adhesion protein selectively adheres only the newly formed PDMS cracks. Cells are then seeded onto the entire surface of the system and selectively adhere only to the laminin/fibronectin coated cracks.

Figure 37:
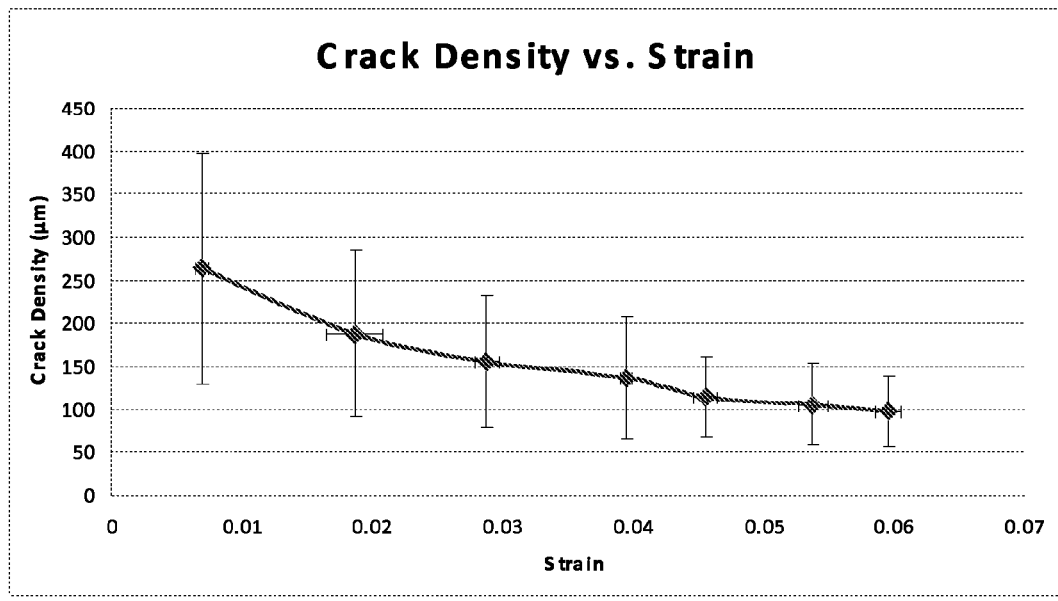
FIG. 37 shows crack density and depth of structures of certain embodiments of the present invention.

FIG. 37 shows a characterization of the crack density and depth of the system. There was 8.2% strain in the x-direction and −0.2% strain in the y-direction with a width of ~6.6 μm×depth ~1.7 μm.

Example 4

Figure 38:
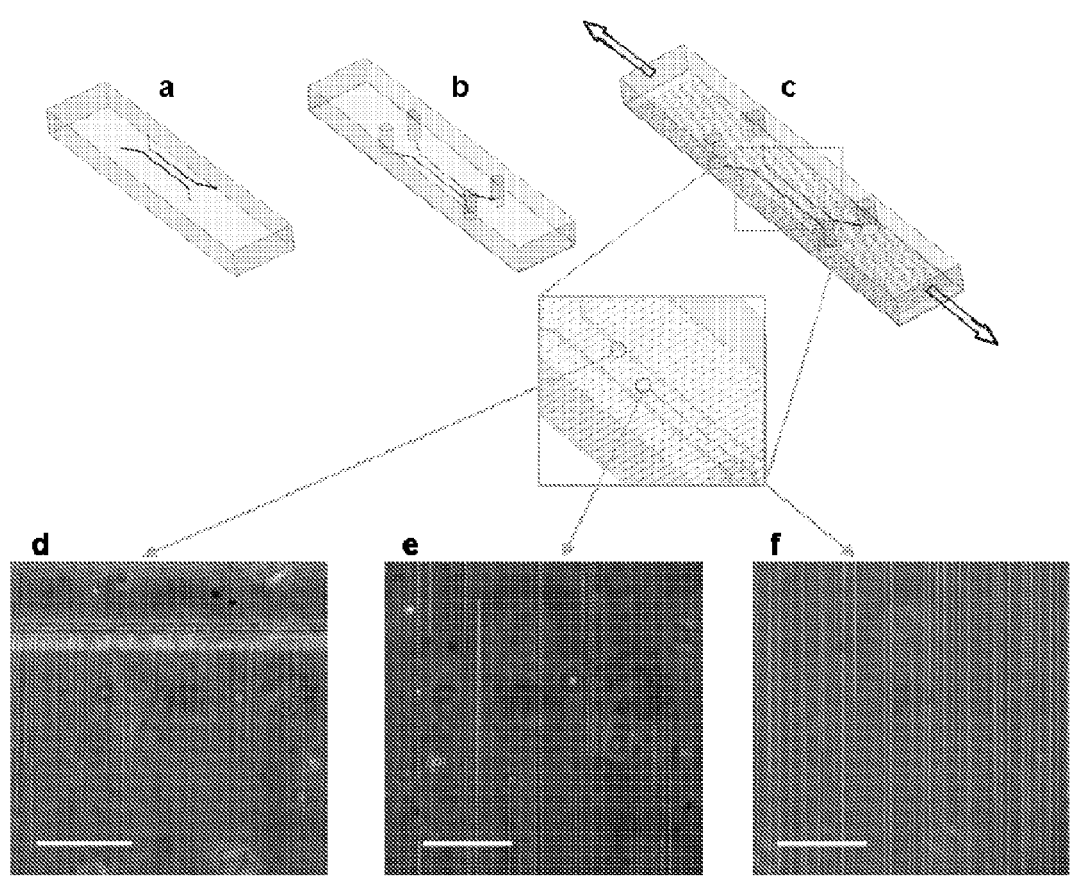
FIG. 38 shows molded PDMS slabs with nanochannels. a. The molded PDMS slab (40 mm×8.5 mm×3.5 mm) containing depressed microchannel features (100 μm×100 μm cross-section). b. The bonded system with 1.5 mm-diameter reservoirs at the ends of each microchannel. c. When the bonded system is stretched, a series of parallel tunneling cracks form which span the distance between the two microchannels, effectively connecting them by nanochannels. d-f. Evolution of the tunnel cracks with increasing applied strain. All scale bars are 100 μm long. d. The boundary with the microchannel (top) is where the majority of the cracks are nucleated at a relatively small amount of strain (approximately 5%). e. With increasing applied strain, the cracks propagate from either microchannel towards the middle of the space between them (approximately 10%). f. The cracks completely traverse the space between the microchannels (approximately 20%).

Adjustable Nanofluidic Channels by Tunnel Cracking of a Constrained Brittle Layer A. Materials and Methods Fabrication of the nanochannels began with casting PDMS prepolymer (10:1 polymer to curing agent) against a photolithographically-prepared SU8 mold containing the positive of a repeating pattern of two parallel micro-channels spaced 1 mm apart. The PDMS was subsequently cured at 60° C. for at least 12 hours. After curing, the PDMS was removed from the mold and slabs of PDMS, each containing a pair of the patterned microchannels, were cut to measure 8.5 mm wide and 40 mm long (FIG. 38a). Inlet and outlet reservoirs were created by using a 1.5 mm-diameter biopsy punch to put holes into the molded PDMS at either end of the two parallel recessed microchannels (cross-sectional dimensions: 100 m×100 m). Featureless PDMS films were made from the same PDMS prepolymer. It was deposited and then evenly coated onto silane-treated glass slides using a spin coater (Brewer Science, Cee 100). The silane treatment ensured that the PDMS films were easily removed from the glass slides in a later step. The PDMS-coated glass slides were placed in the 60 C oven for at least 12 hours. To measure the thickness of the resulting PDMS thin films, small slices were made with a scalpel blade and they were attached to glass slides at the cross-section. An optical microscope was used to measure the thickness which was determined to be approximately 160 μm.

Both substrates—the microchannel-patterned and the film—were cleaned using adhesive tape. The microchannel-patterned substrate was placed on a paper tape-covered glass slide for rigid support and then both substrates were placed in a vacuum (40-60 mTorr) for 10-20 minutes prior to exposure to plasma oxygen for 60 minutes (Harrick Plasma, 30 W). Immediately after the plasma treatment, the treated surfaces of the substrates were mated, placing a small amount of pressure to the glass slides that sandwiched the substrates, to ensure conformal contact. In most cases, this procedure created a permanent bond between the two substrates. This technique of forming an irreversible bond is very useful and pervasive in the production of micro-fluidic and µ-TAS devices. The widely-accepted explanation for this phenomenon is that plasma oxidation changes the chemistry of the PDMS surface creating silanol groups (SiOH) at the expense of the methyl groups (Si—$CH_3$) (Duffy et al., *Anal. Chem.* 70, 4974 (1998)). Upon bringing the two slabs of oxidized PDMS together, a condensation reaction occurs between the surface hydroxyl groups forming an Si—O—Si bond between the surfaces. Many researchers have validated this result; and, in some cases, parametric studies have been performed in order to determine the optimal oxidation conditions for consistent bonding (Katzenberg, E-Polymers, (2005)) or the strongest bond (Bhattacharya et al., Journal of Microelectromechanical Systems 14, 590 (2005)). Analogous surface chemistry reactions take place during plasma oxidation on Si, SiO2, quartz, silicon nitride, polyethylene, and glassy carbon (Duffy et al., supra) enabling the irreversible bonding of PDMS to these materials as well.

The portions of the film not covered by the microchannel-patterned substrate were cut away using a scalpel blade and pulled off of the glass slide. Carefully, so as not to produce any handling strains in the bonded system which would introduce tunneling cracks in unfavorable orientations, the glass slide and the PDMS film—bonded to the nanochannels device—were separated. The exposed PDMS/glass edges were briefly soaked with ethanol while sliding the tip of a scalpel blade in between the glass and the PDMS film to release the bonded system without bending or twisting it. A representative drawing of the resulting bonded system is shown in FIG. 38*b*.

The bonded system was loaded into a custom-built screw-driven slider and rail stretching system and initially stretched to approximately 15-25% strain. This uniaxially applied stretching initially introduced the tunneling cracks that span the distance between the pre-patterned microchannels. This stretched assembly was able to fit into the plasma cleaner chamber for further plasma oxygen treatment to ensure the hydrophilicity of the micro- and nanochannel surfaces. A stretcher that was suited to optical microscopy (Micro-Vice Holder) was then used in conjunction with a custom-built X-Y stage that was fitted for an epi-fluorescence microscope (Olympus TE-300) which allowed for simultaneous observation of the tunneling cracks while straining A 60× oil-immersion objective (Nikon Plan Apochromat, NA=1.40) was used and images were captured using a CCD camera (Hamamatsu ORCA-ER).

B. Mechanics of the Tunneling Cracks

In addition to creating the surface chemistry necessary for bonding, exposing PDMS to plasma oxygen creates a thin, brittle, and graded surface-modified layer. Overexposure to plasma oxygen will not only destroy the surface chemistry necessary for bonding (Bhattacharya et al., supra) but will also create a thicker layer of higher-modulus surface-modified material that will not be able to deform readily enough for the intimate contact necessary for bonding. A four-minute exposure to plasma oxygen at 100 W power was determined, in a previous study, to give a surface-modified layer thickness of approximately 200 nm and an elastic modulus approximately four times that of the PDMS substrate. Additionally, it was determined that channeling cracks in that system penetrated deeper than the measurable region effected by the plasma treatment. In the present study, a power of 30 W was used for 60 minutes to create a surface-modified layer that was easily bonded but also produced cracks on the order of 1-4 µm wide when fully stretched (~30-40% applied strain).

Following fabrication of the nanochannels device, qualitative observations of the behavior of the tunneling cracks were made. The device was mounted into a stretcher and placed on an optical microscope platform for the simultaneous observation of the bonded area between the microchannels as tensile strain was applied. Upon the application of a relatively small amount of uniaxial tensile strain (approximately 5%), tunnel cracks were nucleated at pre-existing flaws in the surface-modified layer; the majority of which were located at the edges of the microchannels (FIG. 38*d*). With increasing strain, the tunnel cracks continued to propagate from either microchannel towards the area between them (FIG. 38*e*). When energetically favorable (the nearest neighbors to a tunnel crack were far enough away to not impede the propagation of a crack) a crack continued to traverse the region between the microchannels and complete a path between them (FIG. 38*f*). Increasing the strain caused both the formation of new cracks and the enlarging of existing cracks. Decreasing the strain caused the crack sizes to decrease and upon complete removal of the strain, the cracks were completely healed. The strain could then be reapplied to reopen the existing cracks.

Figure 39:
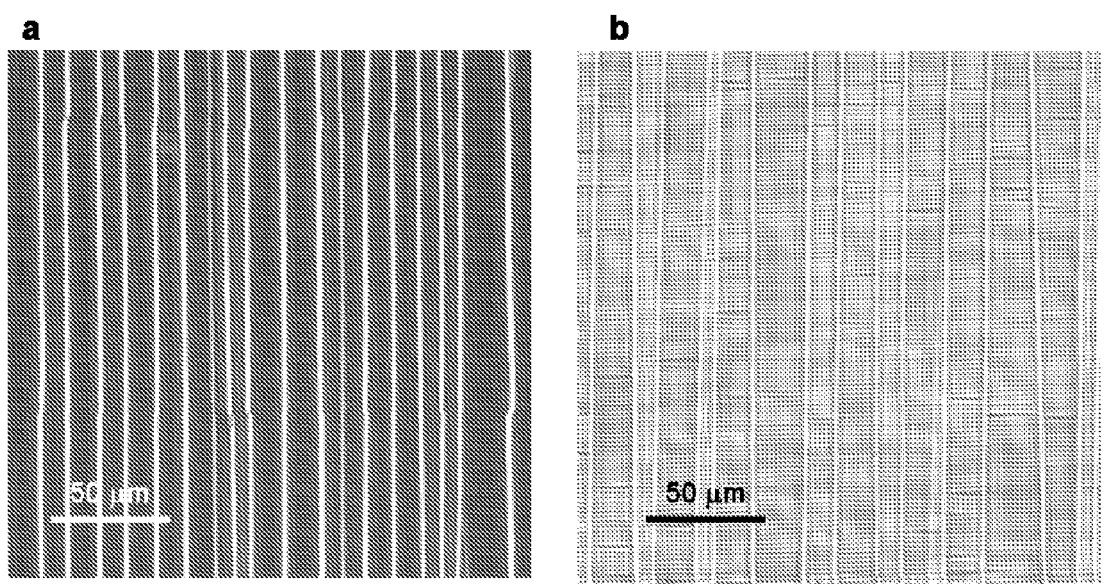
FIG. 39 shows nanochannels of embodiments of the present invention. a. Nanochannels created by tunnel cracking in bonded surface-modified layers (550 nm total thickness) of PDMS. b. Channel cracking in the surface-modified layer of PDMS.
Figure 40:
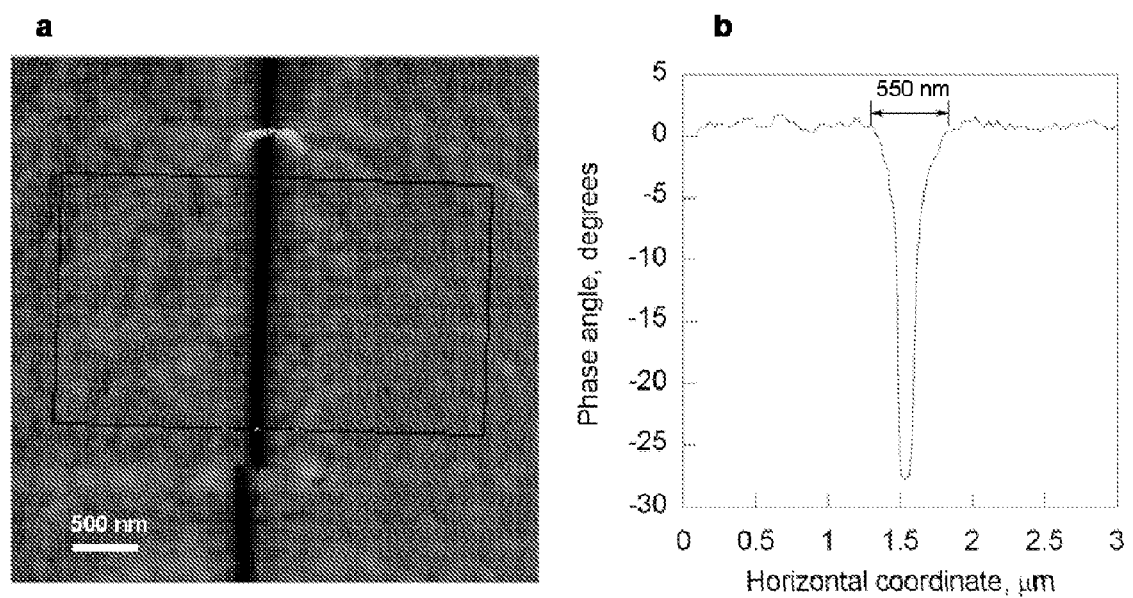
FIG. 40 shows AFM images of nanochannels of embodiments of the present invention. a. AFM tapping mode 2D phase image of the cross-section containing the bonded surface-modified layers. b. Average trace showing the total thickness of the two surface-modified layers bonded together.

An experiment was performed where three slabs of PDMS (10 mm×40 mm×2 mm) were oxidized for four minutes at an RF power of 100 W. Two of the PDMS slabs were bonded together and then strained to 30% and the third was left unbonded and strained to 30%. The cracking of the two specimens was both qualitatively and quantitatively compared. FIG. 39*a* and FIG. 39*b* show optical images of the tunneling and channeling cracks, respectively; each was held at a strain of 30%. Along with the channeling cracks in the free surface-modified layer, surface buckling is visible perpendicular to the cracks. The buckling is suppressed when the surfaces are first bonded together and then strained. Using an AFM technique (See Examples 1 and 2 above), the thickness of two surface-modified layers created by four-minutes of exposure to plasma oxygen at 100 W bonded together measured 550 nm (FIG. 40).

Figure 41:
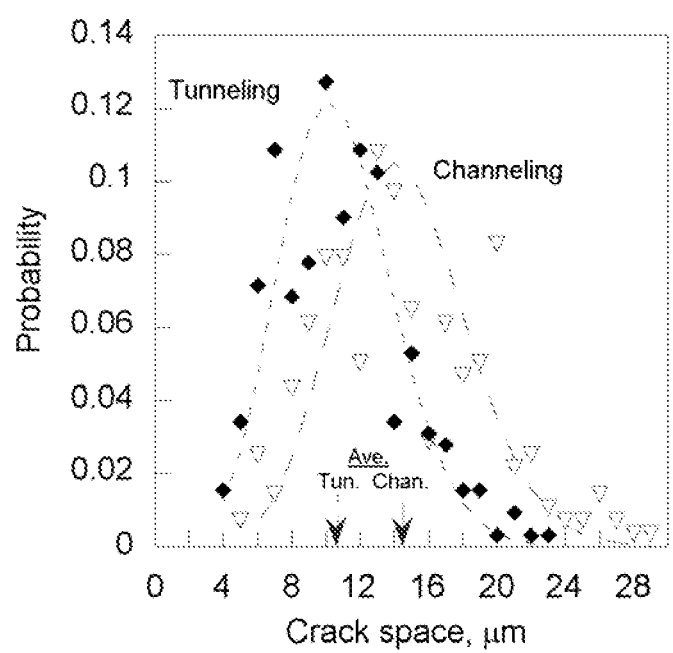
FIG. 41 shows distributions of spacings of the tunneling and channeling cracks.
Figure 42:
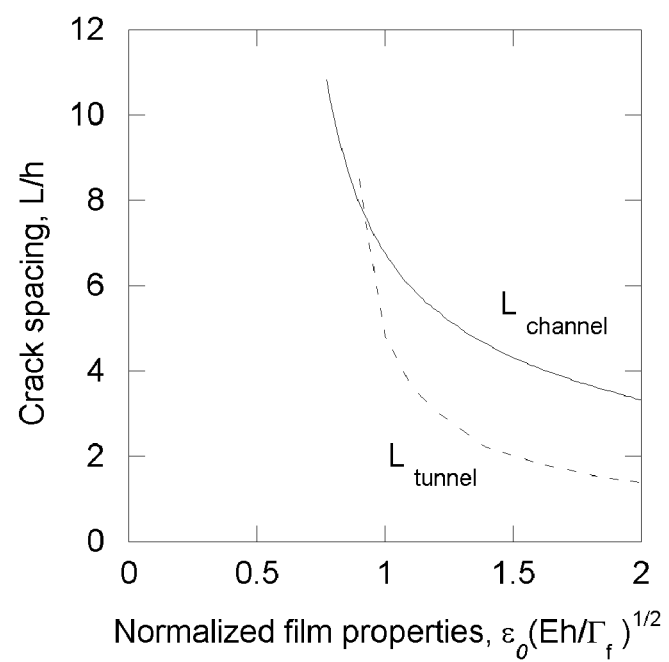
FIG. 42 shows crack spacing of exemplary nanochannels of the present invention.
Figure 43:
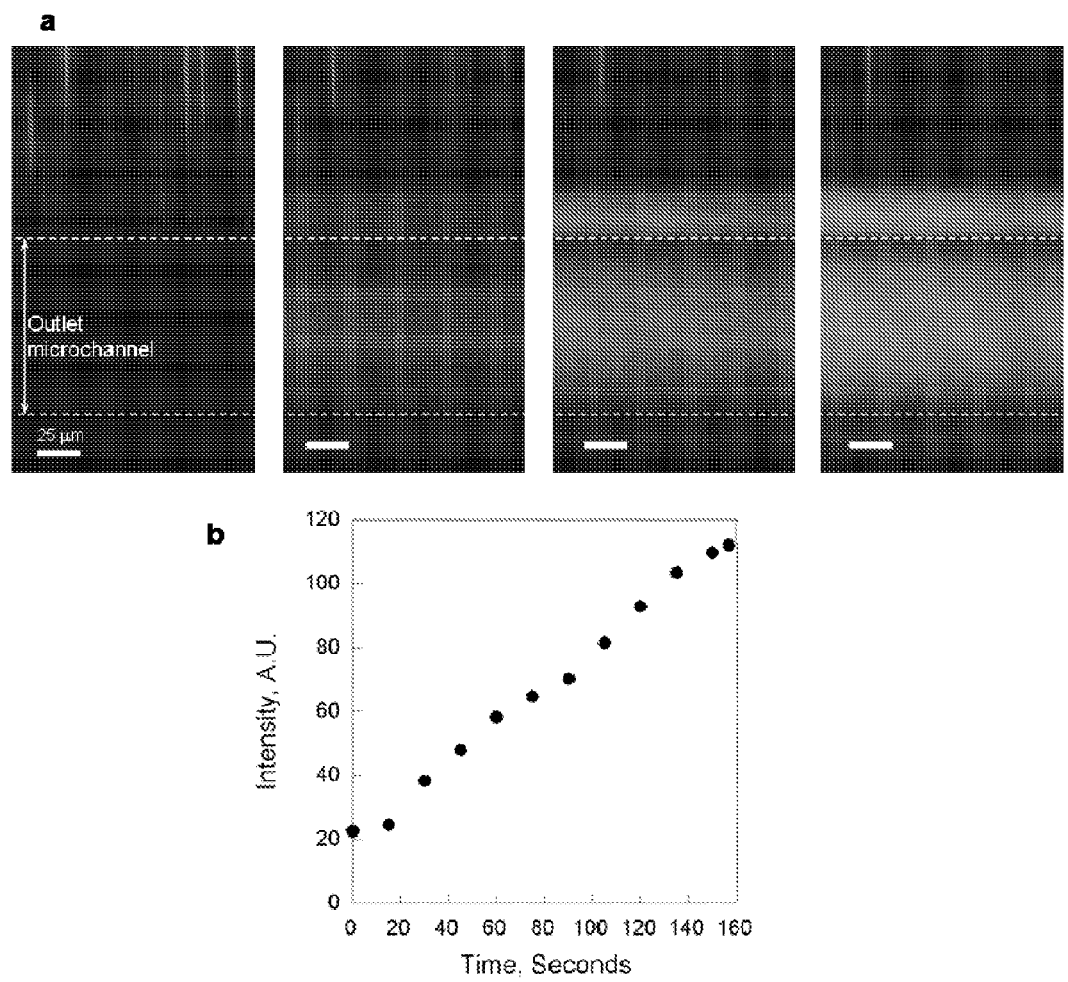
FIG. 43 shows images of the flow of fluorescein through nanochannels of embodiments of the present invention. a. A series of images at elapsed times (0, 60, 120, and 160 seconds) from the introduction of the fluorescein solution into the outlet channel. b. Rate of fluorescence intensity increase as a solution of fluorescein and DI water was introduced into the outlet channel.

Crack spacing at 30% strain of both the tunneling and channeling cracks was then measured. The average spacing of the tunneling cracks was 10.7±3.3 µm and that for the channeling cracks was 14.5±3.8 µm. Distributions of crack spacing for each are plotted in FIG. 41. Poisson distribution is defined by a single parameter. Poisson distribution describes the distribution of results in an experiment where one counts events (crack spacings) that occur at random, but at a definite, expected average rate. Even though the thickness of the layer through which the tunneling cracks are propagating is nominally twice that as it is for the channeling cracks, there is a higher density of tunneling cracks. This agrees with predicted trends of the spacing of thin-film cracks through a discrete film on a substrate in the channeling (Shenoy et al., Int. J. Fract. 103, 1 (2000)) and tunneling (Ho and Suo, *J. Appl. Mech.-Trans. ASME* 60, 890 (1993)) configurations. A comparison of equilibrium crack spacing with respect to normalized film properties is shown in FIG. 42. Each of these curves is plotted for an appropriate elastic mismatch parameter, $(E_f - E_s)/(E_f + E_s)$, of about 0.6. The curve for the case of the channeling cracks is directly interpolated from Shenoy et al., (supra), FIG. 43; the curve for the case of the tunneling cracks was calculated from the energy-release rate data found in (Ho and Suo et al. (supra), FIG. 5, for the simultaneous tunneling of cracks for a range of h/L values. The sequential formation of cracks has been considered here, and the equilibrium crack spacing in either case is found by minimizing the total free energy of the system (Thouless et al., 1992, supra). Physically, the increased crack density in the bonded sample occurs because of a higher level of constraint felt by the layer than that of the free surface-modified layer. The bonded layer is completely constrained to deform with the substrates in all directions whereas the free surface-modified layer is only constrained by the substrate in the in-plane directions. The effect of having an added degree of constraint in the bonded case causes the effective stress to rise in the surface-modified layer more rapidly.

C. Results

Electrokinetically Driven Flows of Fluorescein Molecules

To show that the nanochannels spanned the distance between the microchannels, a flow of a solution of fluorescein isothiocyanate (FITC)-dextran (molecular weight=500,000 Da) and deionized (DI) water was followed from one microchannel to the other. After a bonded system was fabricated, one microchannel was loaded with pure DI water and the other microchannel was loaded with the fluorescein solution. A tensile strain of approximately 10% was applied to open the nanochannels and the fluid started to fill the nanochannels as the strain was applied. A voltage potential (32 V/cm) was applied across the fluidic circuit driving the fluorescein solution to the opposite microchannel. A sequence of images was taken as the fluorescein solution began to enter the opposite microchannel (representative images shown in FIG. 43a). Intensity measurements, averaged over the center ¼ area of the outlet microchannel, were taken in images at appropriate time intervals. It was estimated by the resulting data (FIG. 43b) that it took 2.5 minutes for an equilibrium concentration of the fluorescein solution to be established in the outlet microchannel.

Electroosmotic Manipulation of Quantum Dots

A solution containing a suspension of quantum dots (Qdot 605 Streptavidin Conjugate, Invitrogen, Qdots) was injected into both of the microchannels. As the bonded system was stretched and the cracks tunneled through the surface-modified layer the quantum dot solution filled the nanochannels. A flow of quantum dots was driven electroosmotically by an applied electric field with magnitudes ranging from 10 to 40 V/cm. The quantum dots were observed to flow towards the negatively charged electrode and upon reversal of the electric field they changed direction. Finally, releasing the strain closed the nanochannels effectively trapping the quantum dots.

Figure 44:
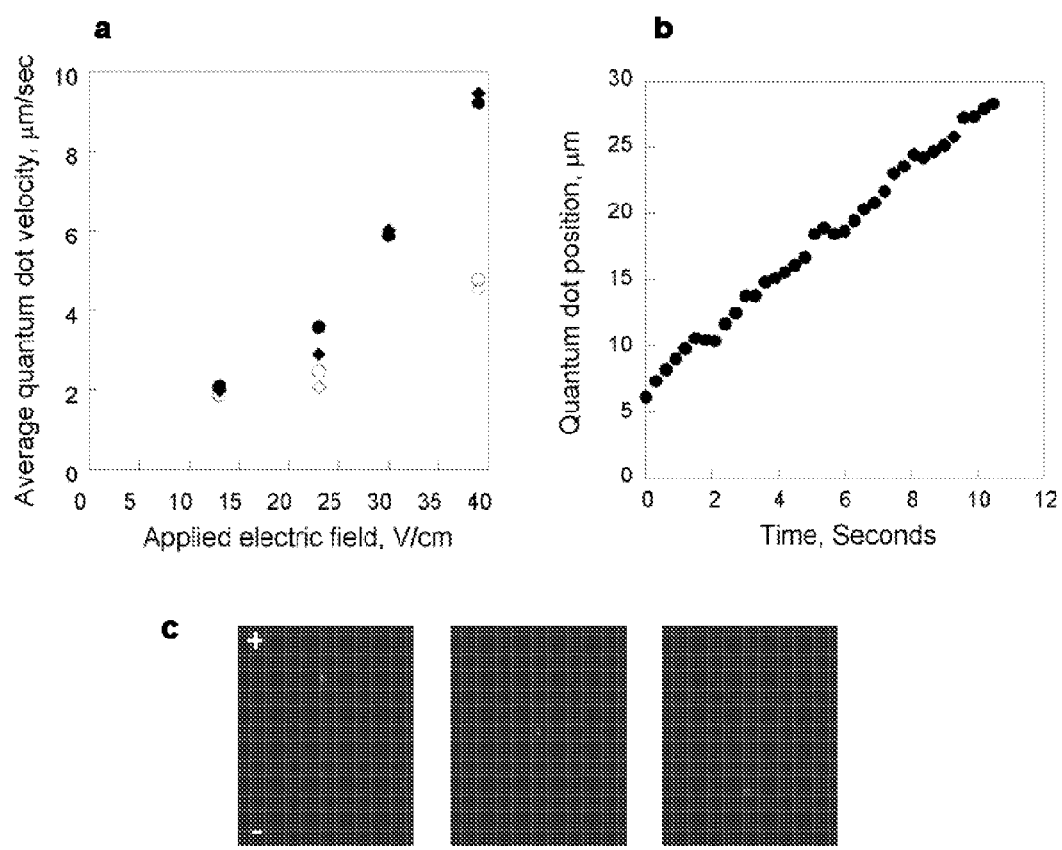
FIG. 44 shows the movement of quantum dots through nanochannels of embodiments of the present invention. a. The average velocity of two different quantum dots (diamond and circle markers) subject to various different levels of an applied electric field. b. The stop-and-start behavior of a quantum dot as it travels through a nanochannel. c. A sequence of images of a single quantum dot traveling in a nanochannel under an applied electric field of 13 V/cm.

To determine the sensitivity of the flow of the quantum dots to the electric field, their position was tracked in a sequence of images captured for each of a series of applied voltage potentials. The applied strain was held constant at 10% and the flow of two quantum dots was followed for voltage potentials of 13, 23, 30, and 39 V/cm. At some point during the sequence at each potential, the polarity of the electric field was changed so that the rate of travel of the quantum dots was tracked in each direction. The velocity of the quantum dots increased with increasing magnitudes of electric field (FIG. 44a). The quantum dots did not traverse the nanochannels at a steady-state flow rate. Rather, they followed a pattern of stopping and vibrating in place before starting again with a relatively constant rate before stopping again several microns later. This is most likely due to an adhesive interaction between the quantum dots and the walls of the nanochannels. A representative plot of quantum dot position with time showing this behavior is shown in FIG. 44b. The quantum dots traveled faster in one direction than they did in the other (FIG. 44a).

Electrical Resistance Measurements Across Nanochannels

The size adjustability of the nanochannels was investigated by taking measurements of the electrical resistance across the nanochannels. For testing, devices were prepared as described above. Following bonding, a solution of 0.1 molar potassium chloride (0.1 M KCl) was injected in to both microchannels. The device was mounted into a stretcher and silver/silver chloride (Ag/AgCl) electrodes (Warner Instruments, model) were inserted into the opposite, diagonal inlet reservoirs. A constant voltage potential (0.1 V DC) was applied across the electrodes and the resistance was measured using a picoammeter (Keithley Instruments, Inc., Model 6487). Since PDMS is an insulator, the resistance across the span between the microchannels before tunnel cracks were introduced was very high (on the order of G$\Omega$). Once tensile strain was applied to the device, the resistance decreased, but never reached the resistance of the 0.1 M KCl solution, 330-430$\Omega$ that was measured in a Petri dish with the electrodes held apart by the same distance as the length of the microchannels.

Figure 45:
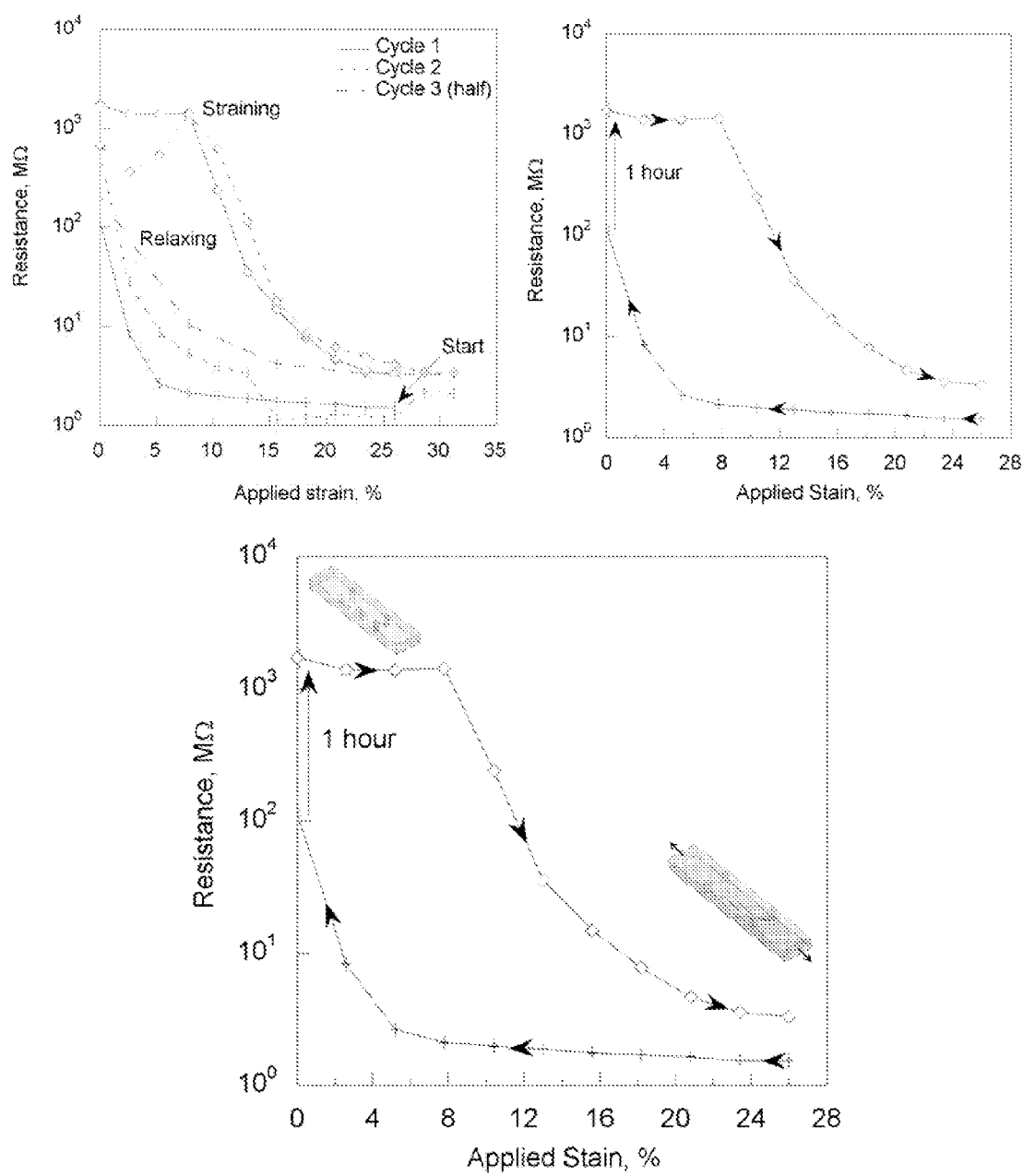
FIG. 45 shows electrical resistance of nanochannels. Electrical resistance measurements were taken on the device with the nanochannels filled with a 0.1 M KCl as the applied strain was being varied from a maximum of approximately 30% to the fully relaxed state.

A controlled experiment was performed after the tunnel cracks were created and it was verified with an optical microscope that the KCl solution had filled the nanochannels. As the nanochannels were held open with a relatively large amount of tensile strain, ~35-40%, a resistance measurement was taken. Subsequent resistance measurements were taken as the applied strain was stepped down in small increments. After stepping the applied strain, the system was given approximately 1 minute to adjust. Once reaching the relaxed state, the process was repeated in reverse: resistance measurements were taken at increments of strain as the applied strain was increased. This cycle was then repeated. Within different cycles, the time of rest between reversing the straining direction was varied. FIG. 45 shows the results for two and a half cycles. The resistance of the system increases as the strain was released, closing the tunnel cracks. There is some time-dependence of the resistance for a given strain. This was partially investigated by giving the system a longer rest time at the midpoint and end of the first cycle. At the fully relaxed state, where, during the course of an hour the resistance increased from approximately 100 M$\Omega$ to 1.5 G$\Omega$. No extended time of rest was given over the remaining cycles. Second, when increasing the applied strain, the tunneling cracks do not reopen until 10% applied strain.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

We claim:

1. A microfluidic system, comprising:
   a) a substrate comprising at least one inlet and at least one outlet formed in said substrate, wherein said inlet and outlet are in fluid communication with one or more closed elastomeric nanochannels that span the distance between said inlet and said outlet and are in fluid communication with both of said inlet and said outlet, wherein said nanochannels are tunneling cracks formed in said substrate by stretching a substrate between said inlet and outlet, and wherein said elastomeric nanochannels are open to said inlet and said outlet when stretched and closed to said inlet and said outlet when relaxed; and
   b) a component configured to exert strain on said nanochannels to stretch said nanochannels.

2. The system of claims 1, wherein said inlet and said outlet are microchannels.

3. The system of claim 1, wherein said substrate is comprised of one or more pieces of a stiff thin film sandwiched by one or more compliant materials.

4. The system of claim 3, wherein said stiff film is oxidized polydimethylsiloxane (PDMS).

5. The system of claim 3, wherein said compliant material is unoxidized bulk PDMS.

6. The system of claim 3, wherein said stiff film is a metal.

7. The system of claim 6, wherein said metal is gold.

8. The system of claim 1, wherein said one or more nanochannels intersect each other.

9. The system of claim 1, wherein said one or more nanochannels originate from different inlets or outlets.

10. The system of claim 1, further comprising a transport component configured to transport molecules through said nanochannels.

11. The system of claim 10, wherein said transport component generates an electric field.

12. The system of claim 1, wherein said system further comprises a biological molecule contained in said nanochannels.

13. The system of claim 12, wherein said biological molecule is selected from the group consisting of a nucleic acid and protein.

14. A cell growth system, comprising:
a) a substrate comprising at least one inlet and at least one outlet formed in said substrate, wherein said inlet and outlet are in fluid communication with one or more closed elastomeric nanochannels that span the distance between said inlet and said outlet and are in fluid communication with both of said inlet and said outlet, wherein said nanochannels are tunneling cracks formed in said substrate by stretching a substrate between said inlet and said outlet, and wherein said elastomeric nanochannels are open to said inlet and said outlet when stretched and closed to said inlet and said outlet when relaxed;
b) a component configured to exert strain on said nanochannels to stretch said nanochannels such that the cross section of said nanochannels are altered when stretched; and
c) a plurality of cells or cellular portions contained within said nanochannels.

15. A method, comprising:
a) contacting a biological molecule, nanoparticle, or cell with a system comprising i) a substrate comprising at least one inlet and at least one outlet formed in said substrate, wherein said inlet and outlet are in fluid communication with one or more closed elastomeric nanochannels that span the distance between said inlet and said outlet and are in fluid communication with both of said inlet and said outlet, wherein said nanochannels are tunneling cracks formed in said substrate by stretching a substrate between said inlet and said outlet, and wherein said elastomeric nanochannels are open to said inlet and said outlet when stretched and closed to said inlet and said outlet when relaxed; and ii) a component configured to exert strain on said nanochannels to stretch said nanochannels such that the cross section of said nanochannels are altered when stretched; and
b) performing a biological assay on said biological molecule, nanoparticle, or cell.

16. The method of claim 15, further comprising the step of moving said biological molecule, nanoparticle, or cell into or through said nanochannels using a transport component.

17. The method of claim 16, wherein said transport component generates an electric field.

18. The method of claim 15, further comprising the step of exerting strain on said nanochannels under conditions such that the cross section of said nanochannels is altered.

19. The method of claim 15, wherein the cross section of said nanochannels is altered such that smaller molecules move through the channels and larger molecules are excluded from nanochannels or not allowed to move through nanochannels.

20. The method of claim 15, wherein said biological molecule is selected from the group consisting of a nucleic acid and a protein.

21. The method of claim 15, wherein said biological assay is selected from the group consisting of a nucleic acid stretching assay, a nucleic acid sequencing assay, and an assay for determining cell growth or viability.

* * * * *